(12) United States Patent
Thiel

(10) Patent No.: US 12,477,082 B2
(45) Date of Patent: *Nov. 18, 2025

(54) MOVEMENT TRACKING FOR VIDEO COMMUNICATIONS IN A VIRTUAL ENVIRONMENT

(71) Applicant: Zoom Communications, Inc., San Jose, CA (US)

(72) Inventor: Jordan Thiel, Leander, TX (US)

(73) Assignee: Zoom Communications, Inc., San Jose, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 18/411,466

(22) Filed: Jan. 12, 2024

(65) Prior Publication Data

US 2024/0155074 A1  May 9, 2024

Related U.S. Application Data

(63) Continuation of application No. 17/515,494, filed on Oct. 31, 2021, now Pat. No. 11,910,132.

(51) Int. Cl.
*H04N 7/14* (2006.01)
*G03H 1/00* (2006.01)
(Continued)

(52) U.S. Cl.
CPC ........... *H04N 7/157* (2013.01); *G03H 1/0005* (2013.01); *G06F 3/014* (2013.01); *G06T 13/40* (2013.01);
(Continued)

(58) Field of Classification Search
CPC ............. H04N 7/157; G03H 1/0005; G03H 2001/0088; G06F 3/014; G06T 13/40; G06T 19/006

See application file for complete search history.

(56) References Cited

U.S. PATENT DOCUMENTS

| 5,850,352 A | 12/1998 | Moezzi et al. |
| 10,205,910 B2 | 2/2019 | Valli |

(Continued)

FOREIGN PATENT DOCUMENTS

WO  2019199569 A1  10/2019

OTHER PUBLICATIONS

International Search Report and Written Opinon mailed on Mar. 2, 2023 in corresponding PCT Application No. PCT/US2022/048343.

(Continued)

*Primary Examiner* — Haoshian Shih
(74) *Attorney, Agent, or Firm* — Young Basile Hanlon & MacFarlane, P.C.

(57) ABSTRACT

Methods, systems, and apparatus, including computer programs encoded on computer storage media relate to a method for head tracking for video communications in a virtual environment. The system may provide a video conference session in a virtual environment. The system may provide a digital representation of the video conference participant in the virtual environment. The system may display one or more views of the virtual environment in the video conference. The system may track movement of the video conference participant to generate user movement information and may display movement of the video conference participant on the digital representation.

20 Claims, 16 Drawing Sheets

(51) Int. Cl.
  *G06F 3/01* (2006.01)
  *G06T 13/40* (2011.01)
  *G06T 19/00* (2011.01)
  *H04N 7/15* (2006.01)
(52) U.S. Cl.
  CPC ... *G06T 19/006* (2013.01); *G03H 2001/0088* (2013.01)

(56) References Cited

U.S. PATENT DOCUMENTS

| | | |
|---|---|---|
| 10,403,050 B1 | 9/2019 | Beall et al. |
| 10,701,318 B2 | 6/2020 | Valli |
| 11,184,362 B1 | 11/2021 | Krol et al. |
| 11,733,826 B2 | 8/2023 | Thiel |
| 2012/0050323 A1 | 3/2012 | Baron, Jr. et al. |
| 2013/0249947 A1 | 9/2013 | Reitan |
| 2013/0275231 A1 | 10/2013 | Paharia |
| 2015/0091891 A1 | 4/2015 | Raheman et al. |
| 2018/0118130 A1 | 5/2018 | Karabed |
| 2018/0205888 A1 | 7/2018 | Tsukahara |
| 2019/0018364 A1 | 1/2019 | Kim |
| 2019/0065027 A1 | 2/2019 | Hauenstein et al. |
| 2019/0253667 A1 | 8/2019 | Valli |
| 2019/0355179 A1 | 11/2019 | Bortolini et al. |
| 2020/0294317 A1 | 9/2020 | Segal |
| 2020/0322395 A1 | 10/2020 | Copley et al. |
| 2020/0402315 A1 | 12/2020 | Yerli |
| 2022/0086203 A1 | 3/2022 | Morris et al. |
| 2022/0157342 A1 | 5/2022 | Kliushkin et al. |
| 2022/0286657 A1 | 9/2022 | Oz et al. |
| 2022/0413433 A1 | 12/2022 | Parra Pozo et al. |

OTHER PUBLICATIONS

Cha Zhang et al: "Viewport : A Distributed, Immersive Teleconferencing System with Infrared Dot Pattern", IEEE Multimedia, IEEE Service Center, New York, NY, US, vol. 20, No. 1, Jan. 1, 2013 (Jan. 1, 2013), pp. 17-27, XP011493977, ISSN: 1070-986X, DOI: 10.1109/MMUL.2013.12 the whole document.

Fuchs Henry et al: "Immersive 3D Telepresence", IEEE Computer Society, IEEE, USA, vol. 47, No. 7, Jul. 1, 2014 (Jul. 1, 2014), pp. 46-52, XP011554133, ISSN: 0018-9162, DOI: 10.1109/MC.2014. 185 [retrieved on Jul. 22, 2014] the whole document.

Square, "What's the Difference Between and SDK and an API?" https://squareup.com/us/en/townsquare/sdk-vs-api, 2020. (Year: 2020).

MOVEMENT TRACKING FOR VIDEO COMMUNICATIONS IN A VIRTUAL ENVIRONMENT

CROSS-REFERENCE TO RELATED APPLICATION(S)

This application is a continuation of U.S. patent application Ser. No. 17/515,494, filed Oct. 31, 2021, the entire disclosure of which is hereby incorporated by reference.

FIELD

This application relates generally to video communications, and more particularly, to systems and methods for head tracking by a video communications platform for use in a virtual environment.

SUMMARY

The appended claims may serve as a summary of this application.

DETAILED DESCRIPTION OF THE DRAWINGS

Figure 1A:
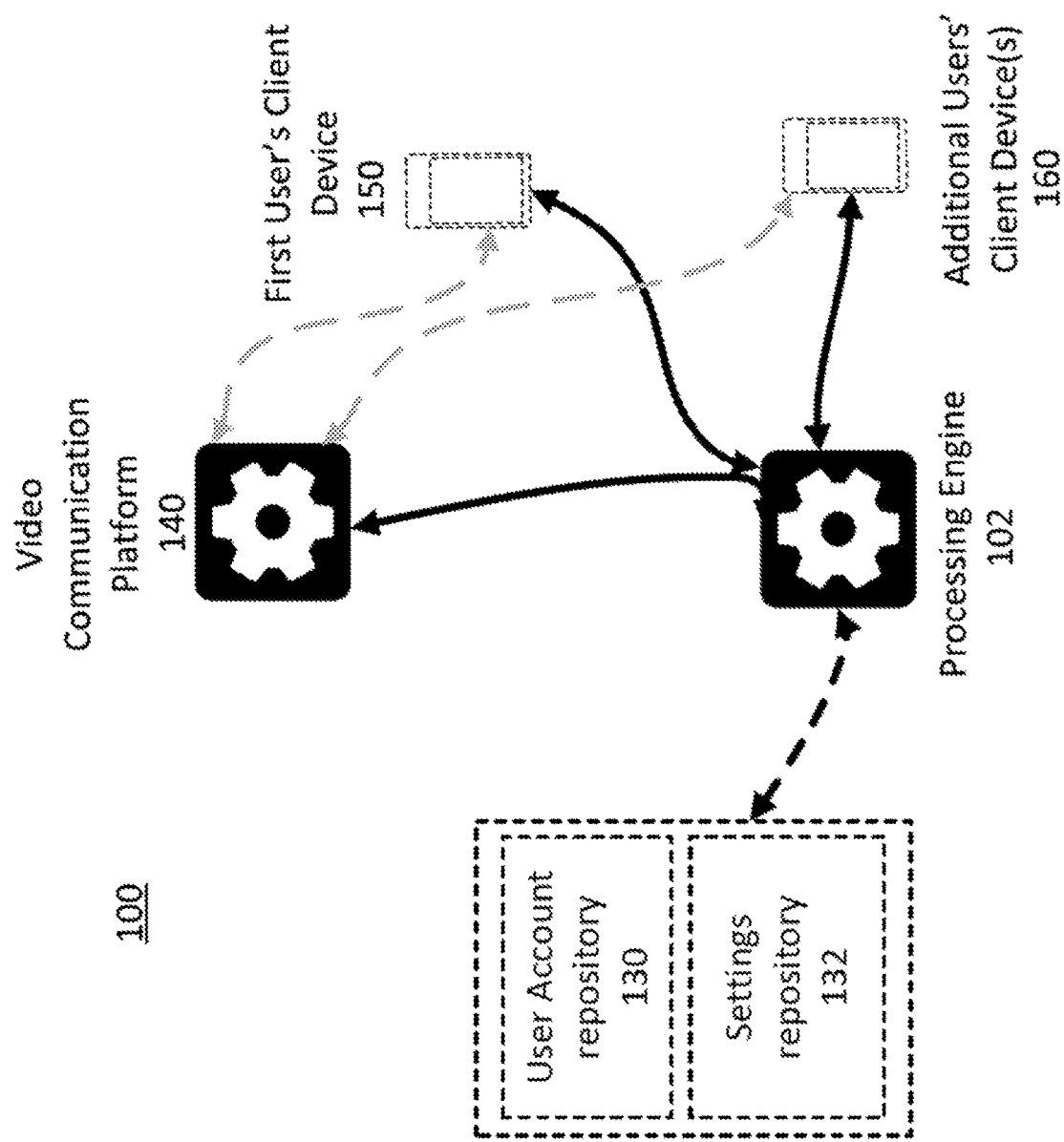
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

I. Exemplary Environments

FIG. 1A is a diagram illustrating an exemplary environment in which some embodiments may operate. In the exemplary environment 100, a first user's client device 150 and one or more additional users' client device(s) 160 are connected to a processing engine 102 and, optionally, a video communication platform 140. The processing engine 102 is connected to the video communication platform 140, and optionally connected to one or more repositories and/or databases, including a user account repository 130 and/or a settings repository 132. One or more of the databases may be combined or split into multiple databases. The first user's client device 150 and additional users' client device(s) 160 in this environment may be computers, and the video communication platform server 140 and processing engine 102 may be applications or software hosted on a computer or multiple computers which are communicatively coupled via remote server or locally.

The exemplary environment 100 is illustrated with only one additional user's client device, one processing engine, and one video communication platform, though in practice there may be more or fewer additional users' client devices, processing engines, and/or video communication platforms. In some embodiments, one or more of the first user's client device, additional users' client devices, processing engine, and/or video communication platform may be part of the same computer or device.

In an embodiment, processing engine 102 may perform the methods 900, 1300, 1400, or other methods herein and, as a result, provide for head tracking for video communications in a virtual environment. A virtual environment may comprise a VR environment or AR environment. In some embodiments, this may be accomplished via communication with the first user's client device 150, additional users' client device(s) 160, processing engine 102, video communication platform 140, and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein.

In some embodiments, the first user's client device 150 and additional users' client devices 160 may perform the methods 900, 1300, 1400, or other methods herein and, as a result, provide for head tracking for video communications in a virtual environment. In some embodiments, this may be accomplished via communication with the first user's client device 150, additional users' client device(s) 160, processing engine 102, video communication platform 140, and/or other device(s) over a network between the device(s) and an application server or some other network server.

The first user's client device 150 and additional users' client device(s) 160 may be devices with a display configured to present information to a user of the device. In some embodiments, the first user's client device 150 and additional users' client device(s) 160 present information in the form of a user interface (UI) with UI elements or components. In some embodiments, the first user's client device 150 and additional users' client device(s) 160 send and receive signals and/or information to the processing engine 102 and/or video communication platform 140. The first user's client device 150 may be configured to perform functions related to presenting and playing back video, audio, documents, annotations, and other materials within a video presentation (e.g., a virtual class, lecture, webinar, or any other suitable video presentation) on a video communication platform. The additional users' client device(s) 160 may be configured to viewing the video presentation, and in some cases, presenting material and/or video as well. In some embodiments, first user's client device 150 and/or additional users' client device(s) 160 include an embedded or connected camera which is capable of generating and transmitting video content in real time or substantially real time. For example, one or more of the client devices may be smartphones with built-in cameras, and the smartphone operating software or applications may provide the ability to broadcast live streams based on the video generated by the built-in cameras. In some embodiments, the first user's client device 150 and additional users' client device(s) 160 are computing devices capable of hosting and executing one or more applications or other programs capable of sending and/or receiving information. In some embodiments, the first user's client device 150 and/or additional users' client device(s) 160 may be a computer desktop or laptop, mobile phone, video phone, conferencing system, virtual assistant, virtual reality or augmented reality device, wearable, or any other suitable device capable of sending and receiving information. In some embodiments, the processing engine 102 and/or video communication platform 140 may be hosted in whole or in part as an application or web service executed on the first user's client device 150 and/or additional users' client device(s) 160. In some embodiments, one or more of the video communication platform 140, processing engine 102, and first user's client device 150 or additional users' client devices 160 may be the same device. In some embodiments, the first user's client device 150 is associated with a first user account on the video communication platform, and the additional users' client device(s) 160 are associated with additional user account(s) on the video communication platform.

In some embodiments, optional repositories can include one or more of a user account repository 130 and settings repository 132. The user account repository may store and/or maintain user account information associated with the video communication platform 140. In some embodiments, user account information may include sign-in information, user settings, subscription information, billing information, connections to other users, and other user account information. The settings repository 132 may store and/or maintain settings associated with the communication platform 140. In some embodiments, settings repository 132 may include virtual environment settings, virtual reality (VR) settings, augmented reality (AR) settings, audio settings, video settings, video processing settings, and so on. Settings may include enabling and disabling one or more features, selecting quality settings, selecting one or more options, and so on. Settings may be global or applied to a particular user account.

Video communication platform 140 comprises a platform configured to facilitate video presentations and/or communication between two or more parties, such as within a video conference or virtual classroom. In some embodiments, video communication platform 140 enables video conference sessions between one or more users.

Figure 1B:
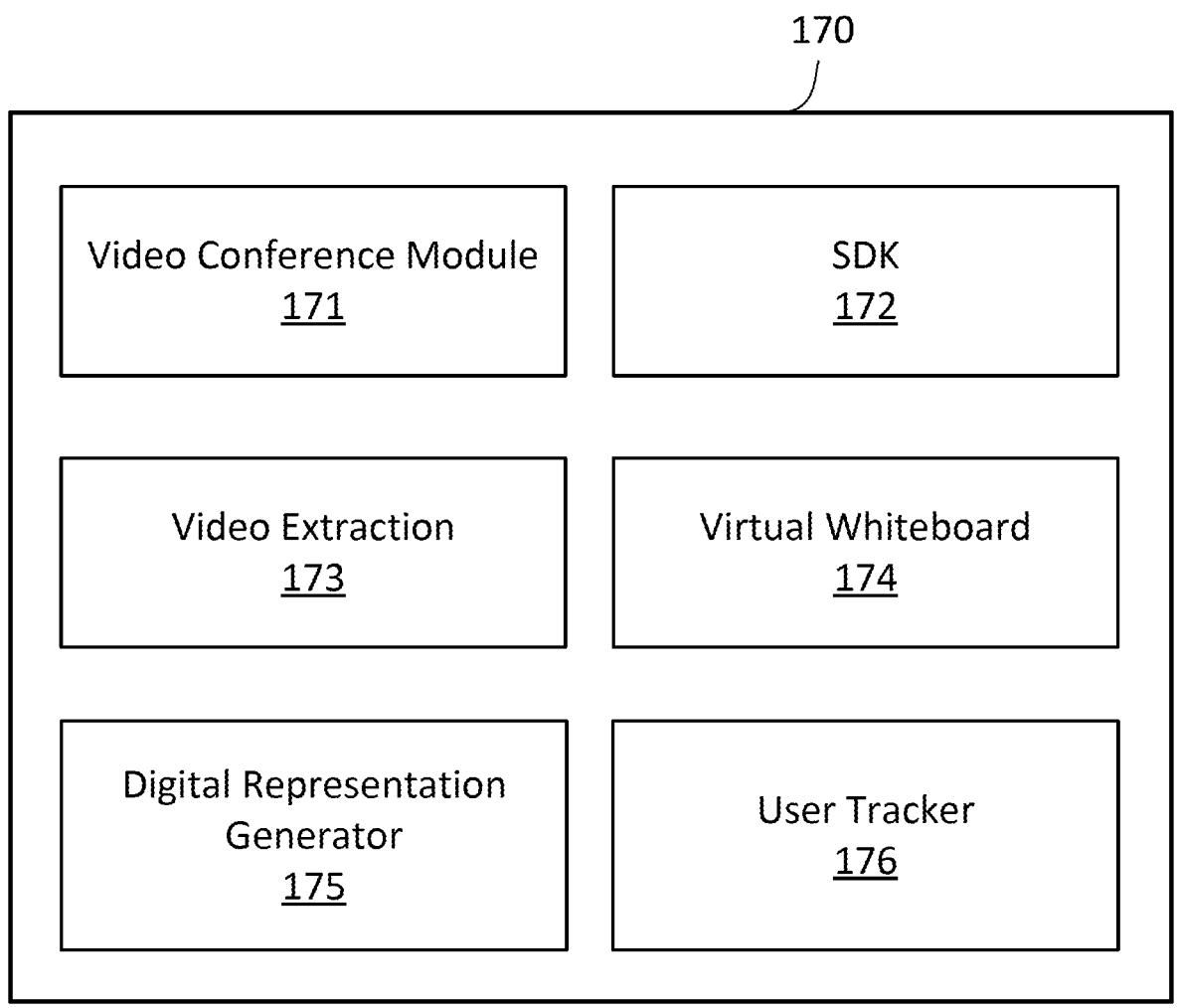
FIG. 1B is a diagram illustrating an exemplary computer system with software and/or hardware modules that may execute some of the functionality described herein.

FIG. 1B is a diagram illustrating an exemplary computer system 170 with software and/or hardware modules that may execute some of the functionality described herein. Computer system 170 may comprise, for example, a server or client device or a combination of server and client devices for extracting a user representation from a video stream to a virtual environment.

Video conference module 171 provides system functionality for providing video conferences between one or more video conference participants. Video conference module 171 may comprise part or all of the video communication platform 140 and/or processing engine 102. Video conference module 171 may host a video conference session that enables one or more participants to communicate over video. In some embodiments, video conference module 171 may require users to authenticate themselves to join a video conference, such as by providing credentials like a username and/or password. In some embodiments, video conference module 171 may allow guest users to join a video conference without authenticating themselves and may notify participants in the meeting that one or more unauthenticated participants are present. A video conference session may include one or more video streams that each display one or more of the participants, or other scenes such as a screen-share or a virtual environment as described herein. In an embodiment, synchronized audio may be provided with the video streams.

Software development kit (SDK) 172 provides system functionality for enabling an application to interface with the video conference module 171. In some embodiments, SDK 172 may comprise an application programming interface (API). SDK 172 may be distributed to enable software developers to use functionality of the video conference module 171 in first party or 3rd party software applications. In some embodiments, SDK 172 may enable first party or 3rd party software applications to provide video communication such as video conferencing via the video communication platform 140 and processing engine 102. In some embodiments, SDK 172 may enable VR or AR applications to integrate video communication into a virtual environment.

Video extraction module 173 provides system functionality for extracting a portion of video containing a user from video content containing the user and a background. In an embodiment, video extraction module 173 may remove a background from video content. In an embodiment, the video extraction module 173 may determine a boundary between a user in a video and the background. The video extraction module 173 may retain the portion of the video depicting the user and remove the portion of the video depicting the background. In an embodiment, the video extraction module 173 may optionally replace the background with a transparent or translucent background or may leave the background empty.

Virtual whiteboard 174 provides system functionality for a virtual collaboration space. In some embodiments, virtual whiteboard 174 may allow functionality such as creating and editing objects, drawing, erasing, creating and deleting text or annotations, and so on. In an embodiment, one or more participants in a video conference session may share one or more virtual whiteboards 174 where they may collaborate and share information. In some embodiments, the contents of one or more virtual whiteboards 174 may be stored for retrieval at a later date. In some embodiments, contents of one or more virtual whiteboards 174 may be combined with other virtual whiteboards 174, such as by importing the content of virtual whiteboard into another virtual whiteboard.

Digital representation generator 175 provides system functionality for generating a digital representation of a user. In an embodiment, the digital representation generator 175 may generate a digital representation of a video conference participant. In an embodiment, the digital representation of the video conference participant may be provided in a virtual environment. In an embodiment, the generated digital representation may use an extracted video of a video conference participant from video extraction module 173. In alternative variations, the generated digital representation may be generated based on a still image of the video conference participant. Alternatively, the generated digital representation may be based on configuration settings, such as avatar creation by a video conference participant. In an embodiment, the generated digital representation may comprise a 2D or 3D representation.

Digital representation generator 175 may be configured to generate one or several different types of digital representations. In one embodiment, the digital representation of the video conference participant may comprise extracted video of the video conference participant from video extraction module 173. In one embodiment, the digital representation of the video conference participant may comprise a flat shape displaying on a surface of the flat shape the extracted video of the video conference participant from video extraction module 173. In one embodiment, digital representation of the video conference participant may comprise a 3D mesh generated based on the extracted video of the video conference participant and displaying on the surface of the 3D mesh the extracted video of the video conference participant. In one embodiment, the digital representation of the video conference participant may comprise a 3D avatar. In one embodiment, the 3D avatar may be generated based on configuration settings of the video conference participant. Alternatively, the 3D avatar may be generated based on the extracted video of the video conference participant.

User tracker module 176 provides system functionality for tracking the head and/or other body parts of a user. In an embodiment, user tracker module 176 may comprise a head tracker module for tracking the head of a video conference participant during a video conference session. In an embodiment, user tracker module 176 may comprise a body tracker module for tracking the body of a video conference participant during a video conference session. User tracker module 176 may record movements of the head and/or other body parts of the video conference participant and transmit the movements to the video conference module 171 or SDK 172. In an embodiment, user tracker module 176 may comprise an artificial intelligence or machine learning module for analyzing a video stream to determine the movement of a video conference participant's head and/or other body parts. In an embodiment, user tracker module 176 may comprise eye tracking, face detection, face tracking, person detection, body pose detection and estimation, edge detection, image segmentation, image matting, or other computer vision and image processing methods. Alternatively, user tracker module 176 may track movement of a video conference participant using a wearable device comprising one or more sensors, such as accelerometers or gyroscopic sensors.

Figure 2:
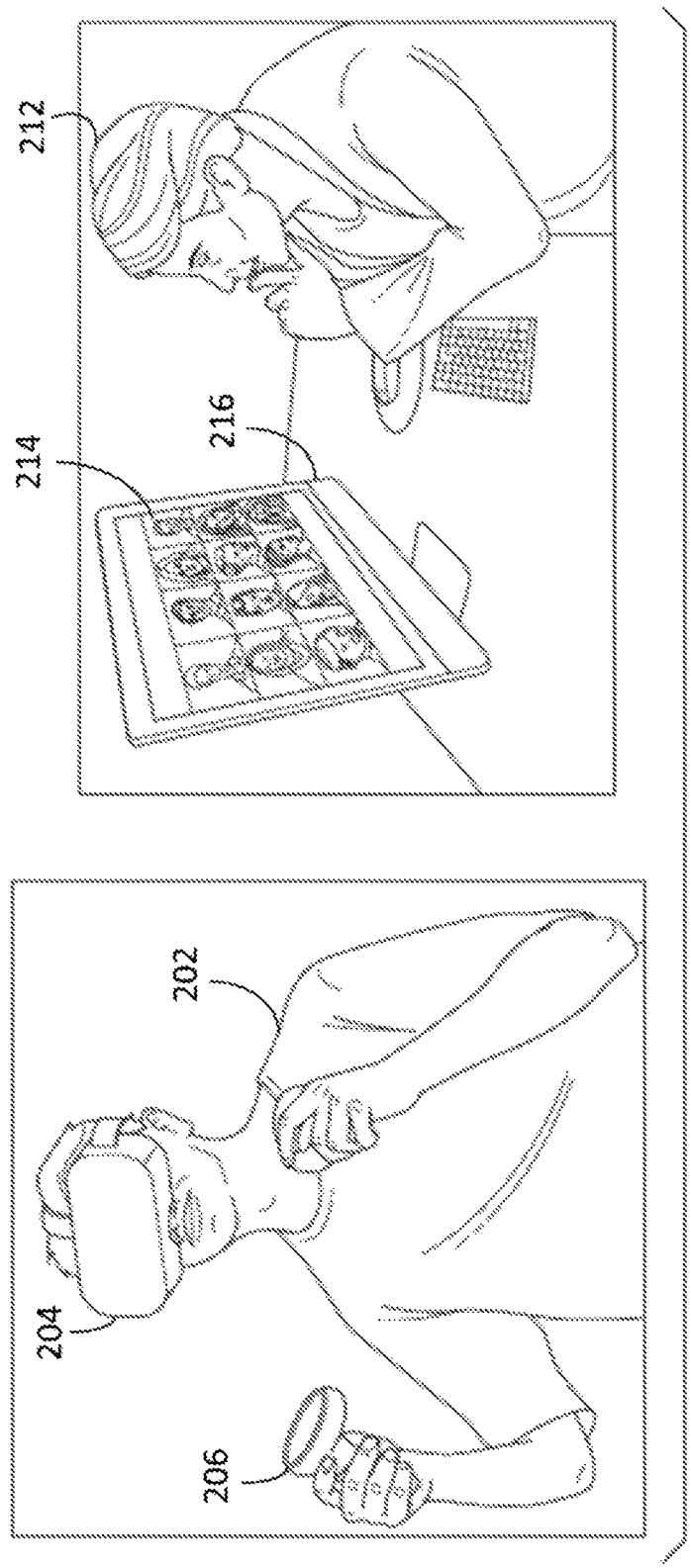
FIG. 2 illustrates one or more client devices that may be used to participate in a video conference and/or virtual environment.

FIG. 2 illustrates one or more client devices that may be used to participate in a video conference and/or virtual environment.

In an embodiment, a VR headset 204 may be worn by a VR user 202 to interact with a VR environment. The VR headset 204 may display 3D graphics to the VR user 202 to represent a VR environment, which may be generated by a VR application. Moreover, the VR headset 204 may track the movement of the VR user's head and/or other body parts to update its display to simulate an experience of being in the VR environment. In an embodiment, a VR headset 204 may optionally include controllers 206 to control the VR application. In some embodiments, the VR headset 204 may enable the VR user 202 to participate in a video conference within a VR environment.

Similarly, in an embodiment, an AR headset may be worn by an AR user to interact with an AR environment. The AR headset may display AR graphics, such as holograms, to the AR user to represent an AR environment, which may be generated by an AR application. The AR application may enable viewing a mixed reality environment that includes some AR objects and some real objects. Moreover, the AR headset may track the movement of the AR user's head or other body parts to update its display to simulate the AR environment. In an embodiment, an AR headset may optionally include controllers to control the AR application. In some embodiments, the AR headset may enable the AR user to participate in a video conference within an AR environment.

In an embodiment, a computer system 216 may provide a video conference application 214 that is communicably connected to video communication platform 140 and processing engine 102. The video conference application 214 may enable a video conference participant 212 to communicate with other participants on a video conference, including participants joining from video conference application 214 or VR headset 204 or an AR headset.

Figure 3:
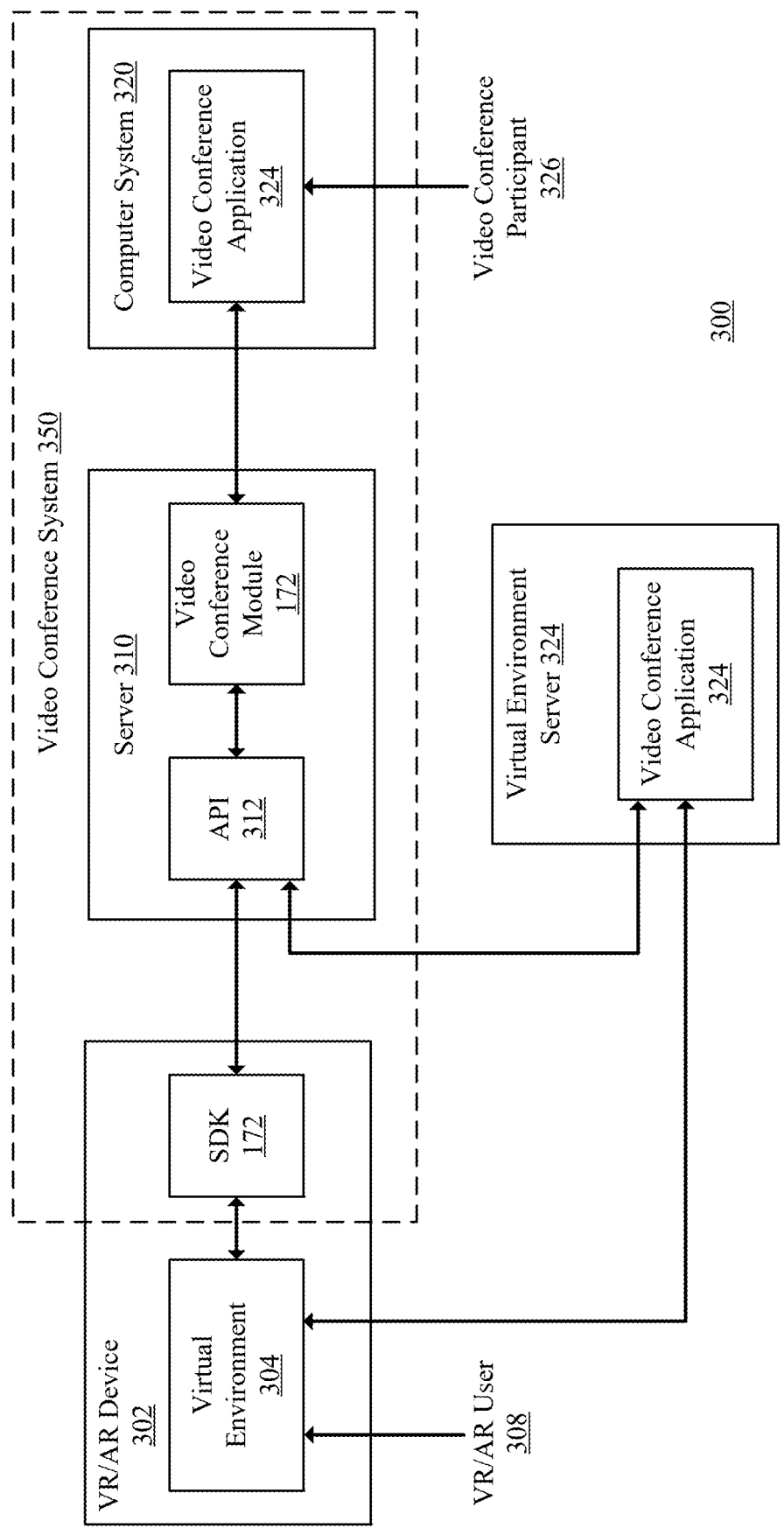
FIG. 3 is a diagram illustrating an exemplary environment in which some embodiments may operate.

FIG. 3 is a diagram illustrating an exemplary environment 300 in which some embodiments may operate. In an embodiment, computer system 320 provides a video conference application 324 that enables video conference participant 326 to join a video conference session. The video conference application 324 connects to server 310 hosting video conference module 171. The video conference module 171 may provide system functionality for hosting one or more video conference sessions and connecting one or more participants via video communication.

In an embodiment, a VR/AR device 302, which may comprise a VR or AR device such as a headset, displays a virtual environment 304, which may comprise a VR environment or AR environment. VR/AR user 308, which may comprise a VR or AR user, may interact with the virtual environment 304 using the VR/AR device 302. Virtual environment 304 may connect with SDK 172 on VR/AR device 302. SDK 172 enables the virtual environment 304, which may comprise a VR or AR application, to connect to API 312 on server 310. The API 312 may provide access to functionality of video conferencing module 171. Virtual environment 304 may be enabled to provide access to video conference sessions that may include other VR/AR users and video conference participant 326 through SDK 172, API 312, and video conference module 171.

In an embodiment, virtual environment 304 may connect to virtual environment service 332 on virtual environment server 330. In an embodiment, the virtual environment service 332 may host a backend of the virtual environment 304. The virtual environment service 332 may comprise data and functions for providing the virtual environment 304 to the VR/AR user 308. For example, virtual environment service 332 may store persistent objects and locations in the virtual environment 304 and maintain a consistent virtual world for experience by other VR/AR users who may also join the same virtual environment through their own VR/AR device. In an embodiment, the virtual environment service 332 may optionally connect to the API 312 to communicate data to and from the video conference module 171. For example, the virtual environment service 332 may transmit or receive global data about the virtual environment 304 with the video conference module 171. In an embodiment, the virtual environment server 330 may include a copy of SDK 172 for interfacing between virtual environment service 332 and API 312.

In an embodiment, the computer system 320, video conference application 324, server 310, video conference module 171, API 312, and SDK 172 may comprise aspects of a video conference system 350. In an embodiment, the virtual environment 304, virtual environment server 330, and virtual environment service 332 may comprise aspects of a 3rd party VR or AR application. Alternatively, the virtual environment 304, virtual environment server 330, and virtual environment service 332 may comprise aspects of a first party VR/AR application that comprise further aspects of video conference system 350.

II. Exemplary Systems

Figure 4:
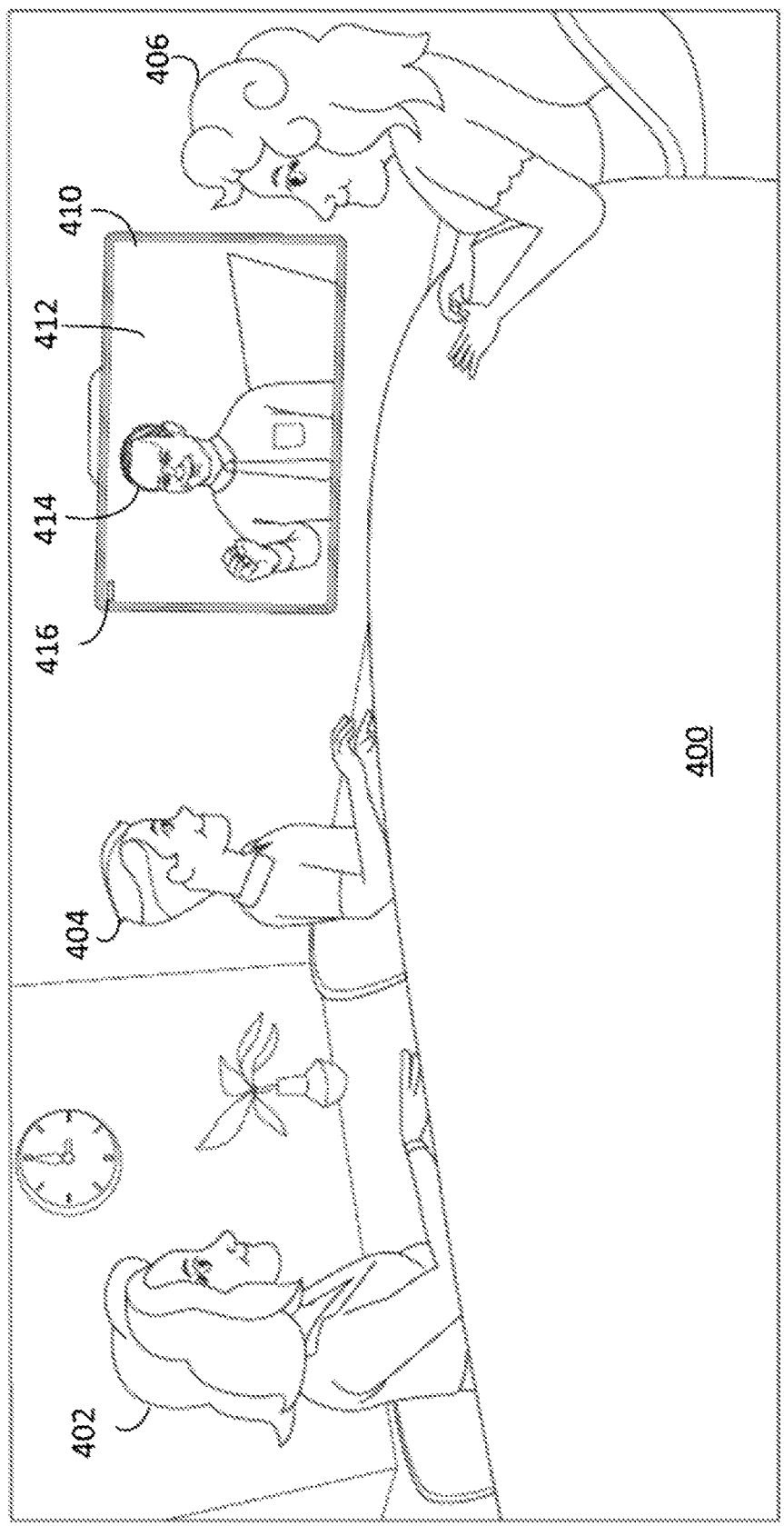
FIG. 4 illustrates an exemplary virtual environment according to one embodiment of the present disclosure.

FIG. 4 illustrates an exemplary virtual environment 400 according to one embodiment of the present disclosure. The virtual environment 400 may comprise a VR or AR environment such as a 3D world including digital representations, such as 3D avatars 402, 404, 406, of one or more users. Digital representations may also comprise 2D representations, such as images, videos, sprites, and so on. Each of the digital representations may represent a VR/AR user who is viewing and interacting with the virtual environment 400 from a VR/AR device. The virtual environment 400 may be displayed to each VR/AR user from the perspective of their digital representations. The virtual environment 400 is illustrated as an indoor conference room, but any other virtual environment may also be presented such as representations of outdoor areas, video game worlds, and so on.

Video conference view 410 in virtual environment 400 may display a video stream 412 including real-time video of video conference participant 414. The video may be captured from the camera of the computer system of the video conference participant 414. The VR or AR application may receive video stream 412 from video conference module 171 through SDK 172 and render the video stream 412 on the surface of a 3D object in the virtual environment 400, such as a 3D representation of a screen, projector, wall, or other object. In an embodiment, the video conferencing application may run in the virtual environment 400. VR or AR application may render a user interface 416 of the video conferencing application that may contain the video stream 412. The user interface 416 may also be rendered on the surface of a 3D object.

Figure 5:
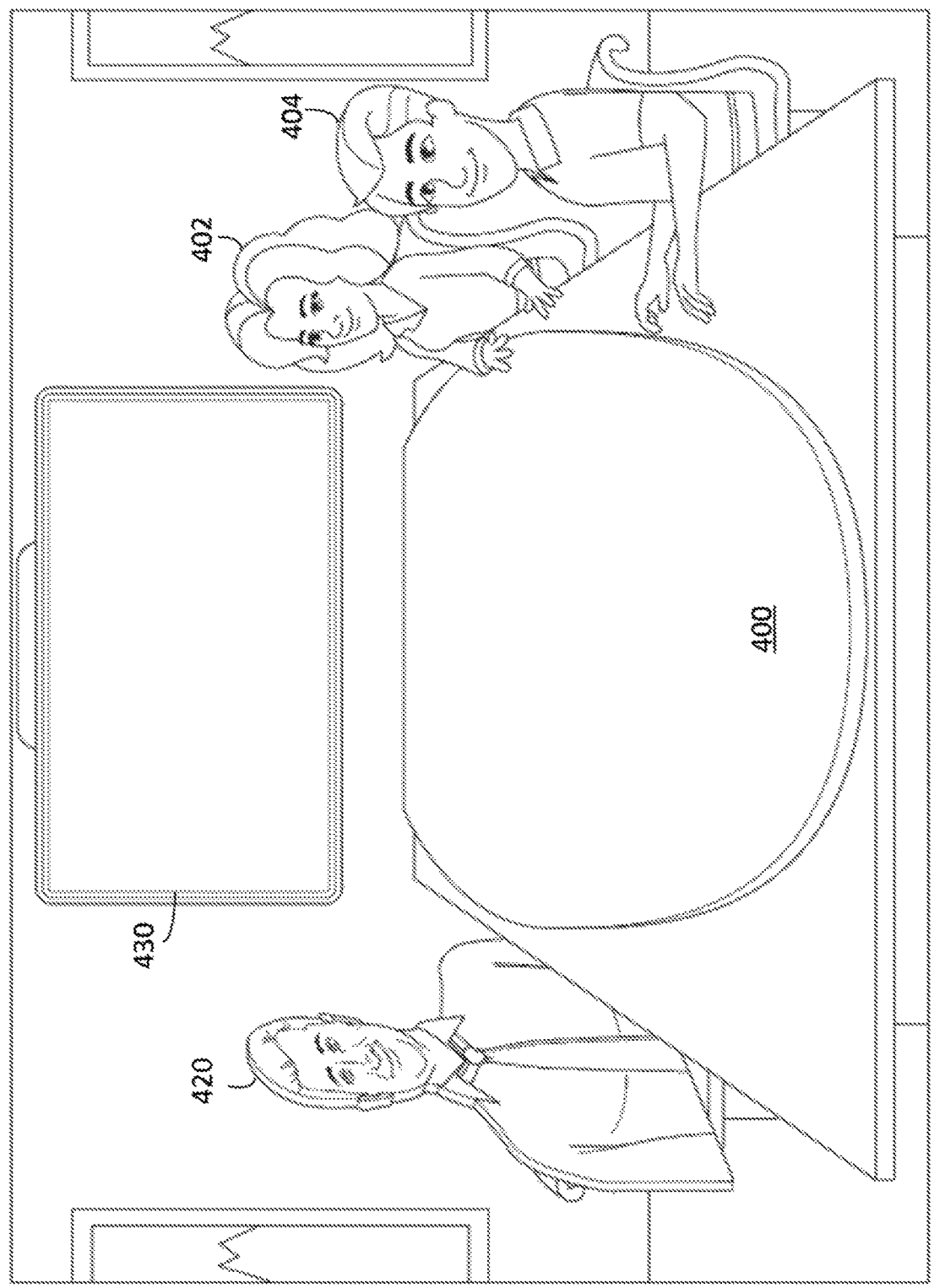
FIG. 5 illustrates an exemplary virtual environment according to one embodiment of the present disclosure.

FIG. 5 illustrates an exemplary virtual environment 400 according to one embodiment of the present disclosure. As described elsewhere herein, the virtual environment 400 may comprise a VR or AR environment such as a 3D world including digital representations, such as 3D avatars 402, 404, of one or more users. The virtual environment 400 may include a digital representation 420 of a video conference participant. Digital representation 420 may alternatively be referred to as an avatar, virtual character, or the like. The digital representation 420 of the video conference participant may be 2D or 3D. In an embodiment, the digital representation 420 of the video conference participant may comprise a video of the video conference participant. In an embodiment, the video may comprise a streaming video that plays in real-time. In an embodiment, the video of the video conference participant may be extracted by the video extraction module 173. In an embodiment, the video of the video conference participant may comprise video depicting imagery of the video conference participant with the background removed. One digital representation 420 is illustrated, but more or fewer digital representations of other video conference participants may be provided in the virtual environment 400.

In an embodiment, the digital representation 420 of the video conference participant may have a location and/or facing direction in the virtual environment 400. For example, the location may comprise coordinates and the facing direction may comprise one or more rotations, quaternions, or so on. In one embodiment, the location and/or facing direction may be modified, which may allow the digital representation 420 of the video conference participant to be moved to different locations in the virtual environment 400 and/or be faced in different directions. In one embodiment, one or more locations in the virtual environment 400 may be selectable, and the digital representation 420 of the video conference participant may be moved to and displayed at a selected location. In an embodiment, the digital representation 420 of the video conference participant may be displayed in a seat, in a standing location, or elsewhere in the virtual environment 400.

The digital representation 420 may be presented in various forms according to various embodiments. In one embodiment, the digital representation 420 of the video conference participant may comprise a flat cut out. For example, the digital representation 420 may comprise a flat shape and the video of the video conference participant may be displayed on the flat shape. The flat shape may comprise one or more polygons. In an embodiment, the video of the video conference participant is displayed on a flat surface of the shape.

In an embodiment, virtual environment 400 may optionally include a virtual whiteboard 430. The virtual whiteboard 430 may include one or more user interface controls for adding and editing content on the virtual whiteboard 430.

Figure 6:
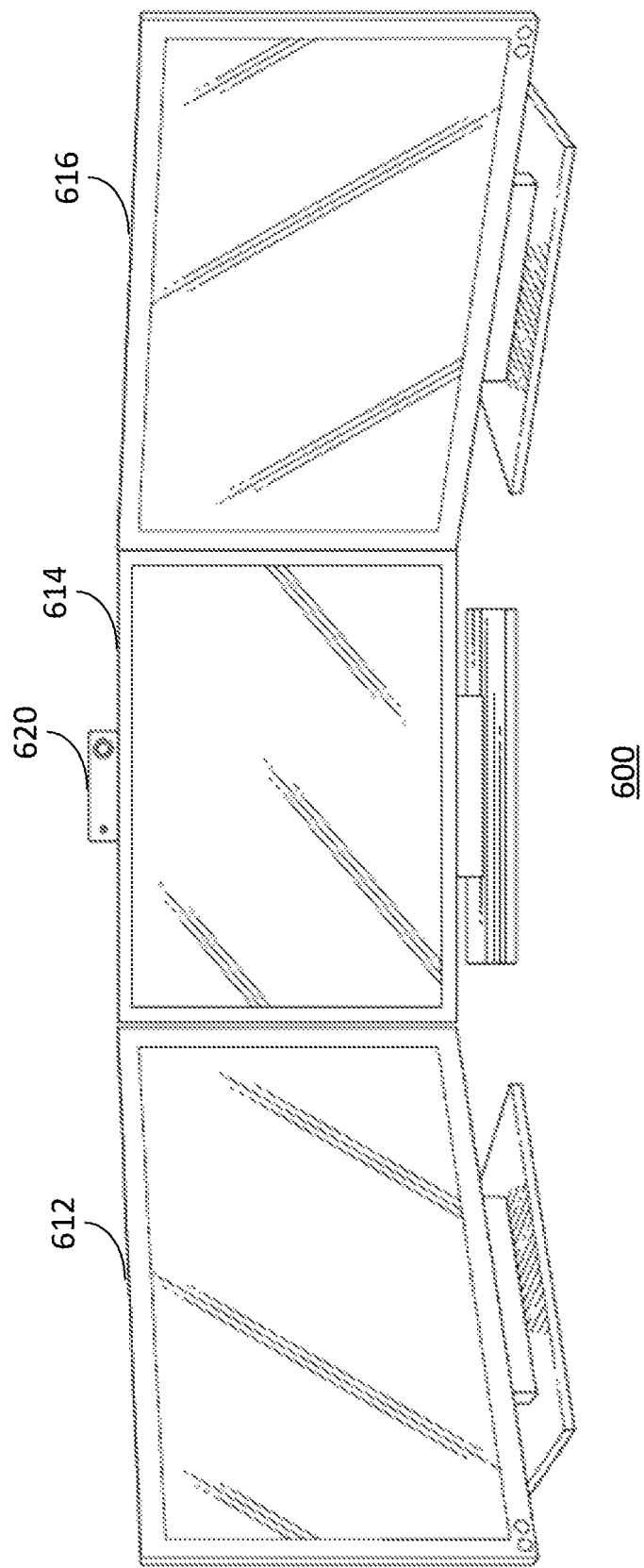
FIG. 6 illustrates an exemplary computer system configuration according to one embodiment of the present disclosure.

FIG. 6 illustrates an exemplary computer system configuration 600 according to one embodiment of the present disclosure. In an embodiment, computer system configuration 600 may include a plurality of screens. In an embodiment, the plurality of screens may be located at a plurality of different locations relative to the video conference participant. The exemplary computer system configuration 600 is illustrated with a left screen 612, center screen 614, and right screen 616, which may be located to the left, front, and right of the video conference participant, respectively. In some embodiments, there may be more or fewer screens in a computer system configuration used by a video conference participant. In an embodiment, a computer system configuration may include additional screens around the video conference participant, such as a far left screen next to the left screen and far right screen next to the right screen. In an embodiment, a computer system configuration may include a plurality of rows of monitors above or below each other. For example, a computer system configuration may include a top left, top center, top right, bottom left, bottom center, and bottom right screen, which may be located at the top left, top center, top right, bottom left, bottom center, and bottom right locations relative to the video conference participant, respectively. In one embodiment, a computer system configuration may comprise one screen, such as illustrated in computer system 216 of FIG. 2.

In an embodiment, the computer system configuration 600 may include a camera 620. The camera may capture video content, such as a video stream, of the video conference participant. The video content may be used to display digital representation 420. In an embodiment, the video content captured by camera 620 may be analyzed by user tracker 176 to determine the head and/or body movement of the video conference participant. Alternatively or in addition, computer system configuration 600 may include a wearable tracker comprising one or more sensors, such as accelerometers or gyroscopic sensors.

In an embodiment, the computer system configuration 600 may include a plurality of cameras. In one embodiment, one or more cameras may be over, near, or associated with each screen. Each camera may capture video content of the video conference participant. The video conference system 350 may switch between the cameras to select the video content of one of the cameras to transmit to a video conference session. In an embodiment, the video conference system 350 may use face detection or face tracking to select the camera having the clearest view of the face of the video conference participant.

In an embodiment, the plurality of screens 612, 614, 616 may be controlled by a processor that enables extending a video conference application, other applications, or home screen across a plurality of screens. The exemplary computer system configuration 600 is illustrated with a desktop. Other types of computer systems may be used with a plurality of screens, such as a laptop, mobile phone, video phone, conferencing system, virtual assistant, virtual reality or augmented reality device, wearable, or any other suitable device capable of sending and receiving information. In an embodiment, one or more of the screens may comprise a computer system, such as a laptop, mobile phone, tablet, or other computer system.

Figure 7:
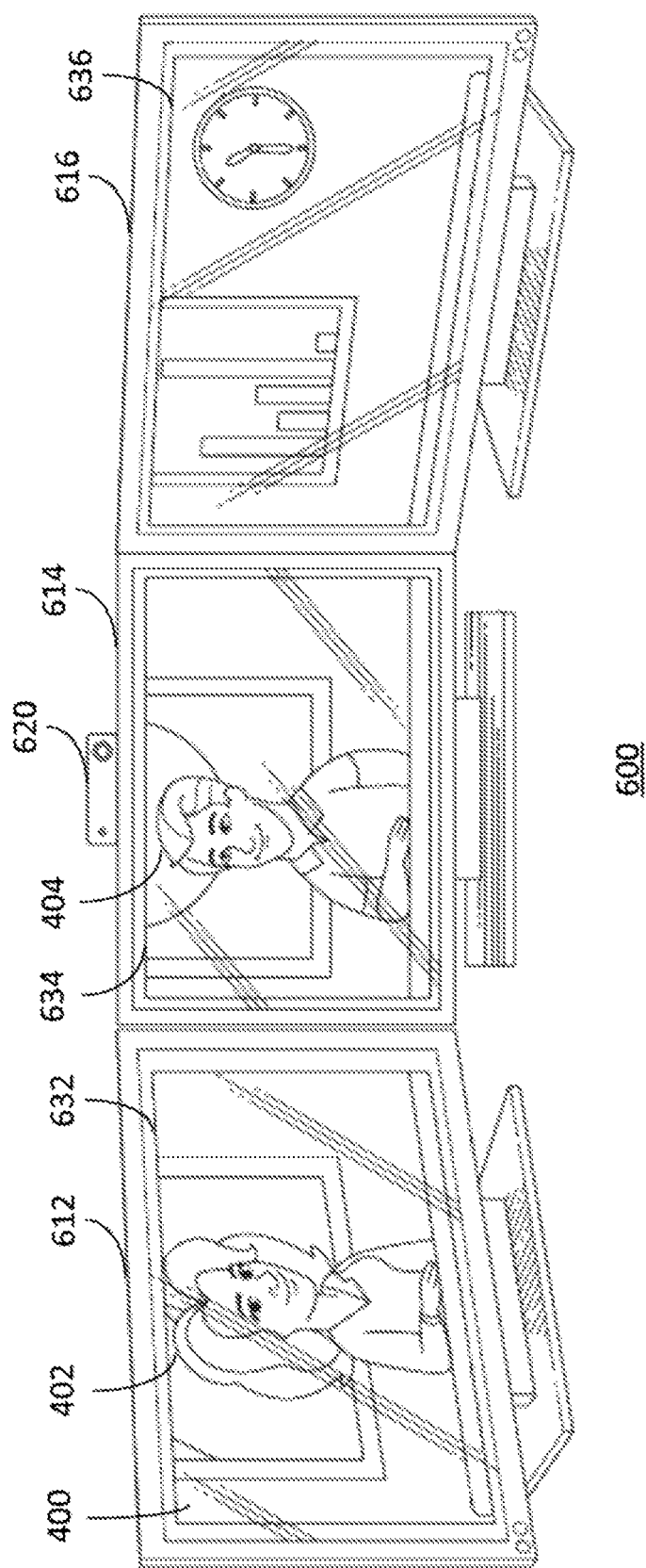
FIG. 7 illustrates an exemplary virtual environment displayed on one or more screens according to one embodiment of the present disclosure.

FIG. 7 illustrates an exemplary virtual environment 400 displayed on one or more screens according to one embodiment of the present disclosure. In an embodiment, virtual environment 400 may be displayed on a plurality of screens of a computer system configuration 600. In an embodiment, each of the screens may display a view corresponding to the location of the screen relative to the video conference participant. In an embodiment, left screen 612, center screen 614, and right screen 616 display a left view, front view, and right view, respectively. In some embodiments, there may be more or fewer screens in a computer system configuration to display more or fewer views to the video conference participant. In an embodiment, additional screens around the video conference participant may display corresponding views, such as a far left view on a far left screen and a far right view on a far right screen. In an embodiment, additional screens may display a top left view, top center view, top right view, bottom left view, bottom center view, bottom right view, and so on, based on the location of the screen relative to the video conference participant. In one embodiment, a computer system configuration comprising one screen, such as computer system 216 of FIG. 2, may display a front view.

In an embodiment, one or more of the screens 612, 614, 616 may display a video conference application. In an embodiment, one or more of the screens 612, 614, 616 may display a user interface of the video conference application. The user interface of the video conference application may include one or more user interface controls for controlling the video conference, sharing the screen, recording, and so on.

In an embodiment, each of the screens of the computer system configuration 600 displays a view of the virtual environment 400 from the viewpoint of the digital representation 420 of the video conference participant. In an embodiment, the relative location of the screen to the video conference participant corresponds to the relative location of the view shown on the screen in relation to the digital representation 420 in the virtual environment 400. In an embodiment, the view on each screen is shown from the viewpoint of the digital representation 420, and the direction of the view matches the direction of that screen from the video conference participant. In one embodiment, each view may comprise a video stream, or portions of the same video stream. In an embodiment, left screen 612 displays a left view 632 of the virtual environment 400 to the left of digital representation 420, center screen 614 displays front view 634 of the virtual environment 400 in front of digital representation 420, and right screen 616 displays a right view 636 of the virtual environment 400 to the right of digital representation 400. In an embodiment, more or fewer views may be shown. In an embodiment, additional screens around the video participant may display additional views from those viewpoints of the digital representation 420. In an embodiment, a far left screen may display a far left view of the virtual environment 400 to the far left of digital representation 420. In an embodiment, a far right screen may display a far right view of the virtual environment 400 to the far right of digital representation 420. In an embodiment, one or more screens may show areas behind the digital representation 420. In an embodiment, a back left screen may display a back left view of the virtual environment 400 to the back left of the digital representation 420, a back screen may display a back view of the virtual environment 400 to the back of the digital representation 420, and a back right screen may display a back right view of the virtual environment 400 to the back right of the digital representation 420. In an embodiment, one or more screens may show areas above or below the digital representation 420. In an embodiment, one or more of a top left, top center, top right, bottom left, bottom center, or bottom right screens may each display a top left, top center, top right, bottom left, bottom center, or bottom right view of the virtual environment 400 to the top left, top center, top right, bottom left, bottom center, or bottom right of the digital representation 420, respectively.

In an embodiment, the screens of the computer system configuration 600 may wrap around the video conference participant to provide direct and peripheral views of the virtual environment 400. In an embodiment, one or more screens in combination may provide a 120-degree view, 180-degree view, 270-degree view, 360-degree view, and so on of the virtual environment 400.

In an embodiment, one or more views may be displayed on a single screen. For example, a curved screen may wrap partly or completely around the video conference participant and display a left view, center view, and right view to the left, front, and right of the video conference participant, respectively, on the single screen.

In an embodiment, one or more views displayed on the screens 612, 614, 616 may be captured by one or more virtual cameras in the virtual environment 400. In an embodiment, the views may comprise video content. The video content may be encoded in streaming video format by an encoder on a VR/AR device 302 or a server 310. In some embodiments, the encoder may comprise SDK 172. In an embodiment, the video content may comprise 2D video formats such as MP4, MP3, AVI, FLV, WMV, and other formats. The video content may be transmitted from the VR/AR device 302 to the video conference module 171 of the server 310 and on to the computer system 320 and video conference application 324. A user interface may be displayed on a computer system to a video conference participant 326.

Each virtual camera may capture a view of the virtual environment 400 comprising a viewport. The viewport may comprise a view of a 3D environment that is captured from a position in the 3D environment. Each virtual camera may generate video content based on the portion of the 3D environment that is within the viewport for transmitting to a video conference application.

In an embodiment, the one or more virtual cameras may be located at the viewpoint of the digital representation 420 of the video conferencing participant. In an embodiment, the virtual cameras may have the same location as the location of the digital representation 420 of the video conferencing participant. In an embodiment, the virtual cameras may have the same location as the location of the eyes, head, chest, or other portion of the digital representation 420 of the video conferencing participant.

In one embodiment, one or more virtual camera may have a wide-angle view that captures video in a wide view of the virtual environment 400. In an embodiment, the wide view video content may be transmitted to the video conference application and split up into one or more views, such as left view 632, center view 634, and right view 636. In an embodiment, the wide view video content may capture a 120-degree view, 180-degree view, 270-degree view, 360-degree view, and so on of the virtual environment 400. In an embodiment, the wide view video content captures a partial or complete sphere around the digital representation 420. In an embodiment, the wide-angle virtual camera may have the same facing direction as the digital representation 420 of the video conference participant. In an embodiment, the wide-angle virtual camera may have the same facing direction as the facing direction of the eyes, head, chest, or other portion of the digital representation 420 of the video conferencing participant.

In one embodiment, a plurality of virtual cameras may be located at the viewpoint of the digital representation 420 of the video conferencing participant. Each virtual camera may be faced in a different direction to capture a view from a different direction. In an embodiment, the virtual cameras may be faced in directions corresponding to each different view shown on the screens of the computer system configuration 600, where each virtual camera is facing and captures one of the views. In an embodiment, a left virtual camera may be facing left to capture a left view of the virtual environment 400 to the left of the digital representation 400, a center virtual camera may be facing frontwards to capture a front view of the virtual environment 400 to the front of the digital representation 400, and a right virtual camera may be facing right to capture a right view of the virtual environment 400 to the right of the digital representation 400. In an embodiment, one or more virtual cameras may be faced backwards to capture views behind the digital representation 420. In an embodiment, one or more virtual cameras may be faced up or down to capture views above or below the digital representation 420. In an embodiment, the video content captured by the plurality of virtual cameras may be transmitted to the video conference application, and the video content of each virtual camera may be displayed on a different screen.

In an embodiment, user tracker 176 may analyze video captured by camera 620 to determine the head and/or body movement of the video conference participant. As the video conference participant turns his or her head or body, such as to view different screens, the user tracker 176 may detect the movement to generate user movement information. In an embodiment, user tracker module 176 may use artificial intelligence or machine learning. In an embodiment, user tracker module 176 may perform eye tracking, face detection, face tracking, person detection, body pose detection and estimation, edge detection, image segmentation, image matting, or other computer vision and image processing methods. Alternatively, user movement information may be generated by a wearable device on the video conference participant comprising one or more sensors, such as accelerometers or gyroscopic sensors. For example, the wearable device may comprise a headset, head tracker, haptic suit, electrodes, or so on. User movement information may be used to move or animate one or more parts of the digital representation 420 of the video conference participant.

In an embodiment, the user tracker 176 may detect when the video conference participant has looked to the edge of a screen and trigger an event. In response to the event, the video conference application may perform an action. In one embodiment, when the user tracker 176 detects that the video conference participant has looked beyond the edge of the screen, the video conference system 350 may transmit a signal to virtual environment 400 to move the viewpoint of the digital representation 420. In one embodiment, when the user tracker 176 detects that the video conference participant has looked beyond the left edge of left screen 612, the video conference system 350 may transmit a signal to virtual environment 400 to turn viewpoint of the digital representation 420 to the left. In one embodiment, when the user tracker 176 detects that the video conference participant has looked beyond the right edge of right screen 616, the video conference system 350 may transmit a signal to virtual environment 400 to turn viewpoint of the digital representation 420 to the right. In response to the change in viewpoint, one or more virtual cameras of digital representation 420 may be turned to a new facing direction, and the video content displayed on the screens 612, 614, 616 may be updated. By enabling the video conference participant to control turning the viewpoint, the video conference system 350 may enable the video conference participant to scroll partly or completely around in a 360-degree view around the digital representation 420.

In one embodiment, computer system configuration 600 may include spatial audio. In an embodiment, computer system configuration 600 may transform the audio output from one or more sound output devices, such as speakers, headphones, earbuds, or other devices to emulate the audio output originating from different 3D locations. In an embodiment, video conference application emulates the placement of sound in a relative location to the video conference participant that corresponds to the placement of the sound relative to the digital representation 420 in the virtual environment 400. In an embodiment, sounds originating to the left of the digital representation 420 in the virtual environment 400 are played to emulate originating to the left of the video conference participant, and sounds originating to the right of the digital representation 420 in the virtual environment 400 are played to emulate originating to the right of the video conference participant. In an embodiment, speech from the 3D avatar 402, which is to the left of digital representation 420, may be played to emulate originating to the left of the video conference participant. In an embodiment, speech from the 3D avatar 404, which is in front of digital representation 420, may be played to emulate originating in front of the video conference participant.

Figure 8:
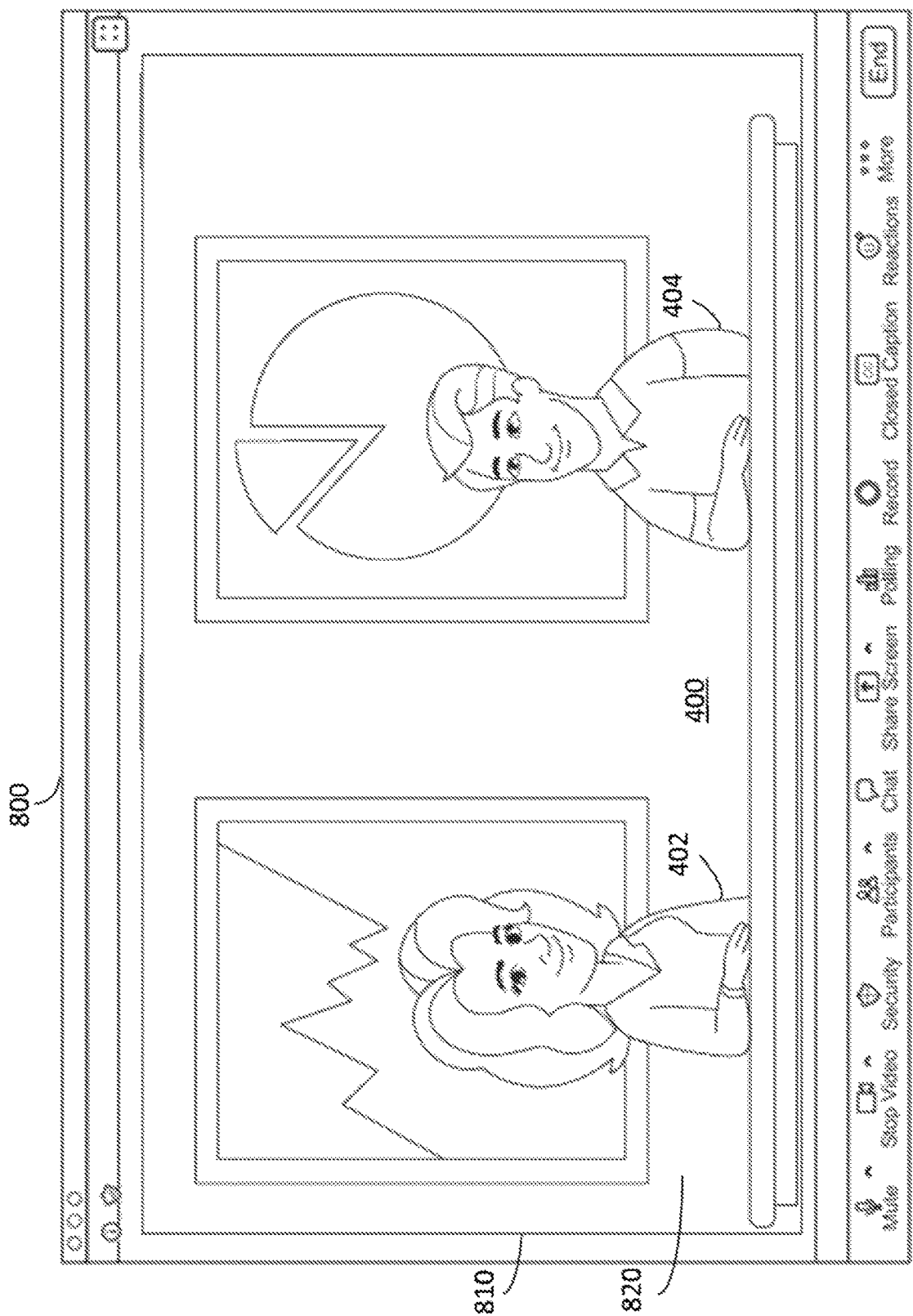
FIG. 8 illustrates an exemplary user interface according to one embodiment of the present disclosure.

FIG. 8 illustrates an exemplary user interface 800 according to one embodiment of the present disclosure. User interface 800 may comprise an interface of a video conferencing application. Content view 810 displays a view of the virtual environment 400, including the 3D avatars 402, 404 of participants in the video conference. The content view 810 may comprise video content 820. In an embodiment, content view 810 may be displayed on one screen.

In an embodiment, content view 810 may display video content from the viewpoint of the digital representation 420 of the video conferencing participant. User tracker 176 may analyze video captured by camera 620 to determine head and/or body movement of the video conference participant. As the video conference participant turns his or her head or body to view different parts of the one screen, the user tracker 176 may detect the movement to generate user movement information as described elsewhere herein.

Figure 9:
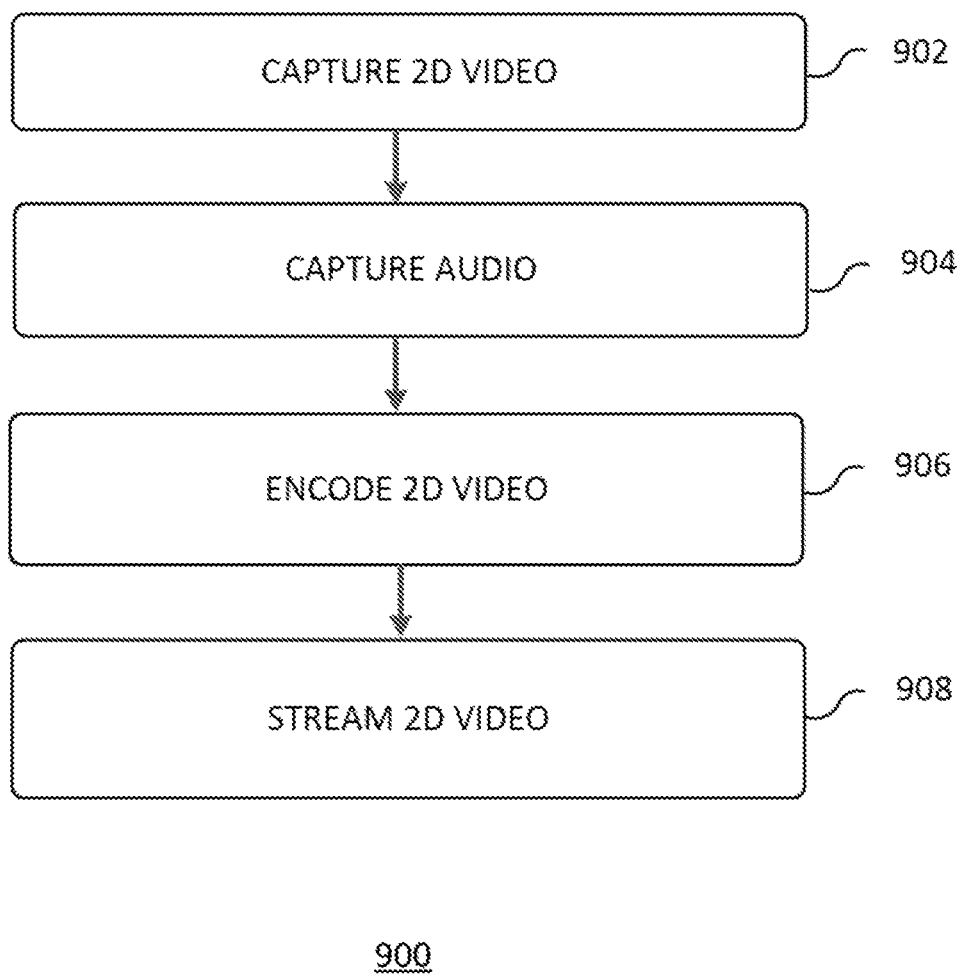
FIG. 9 illustrates an exemplary method that may be performed in some embodiments.

FIG. 9 illustrates an exemplary method 900 that may be performed in some embodiments. Video content may be captured from the virtual environment 400 in many different ways, and method 900 comprises one exemplary method for doing so. At step 902, a video conference application or VR/AR application captures 2D video of a 3D virtual environment. In an embodiment, the 2D video may be captured from the viewport of one or more virtual cameras. At step 904, the video conference application or VR/AR application may capture audio output from the virtual environment and/or from the microphone input of the VR/AR device. At step 906, the video conference application or VR/AR application may encode the 2D video. In some embodiments, the 2D video may be encoded into a streaming video format and may include the audio output. The encoding may be compressed or uncompressed. At step 908, the video conference application may stream the 2D video to a video conference module and one or more client devices.

Figure 10:
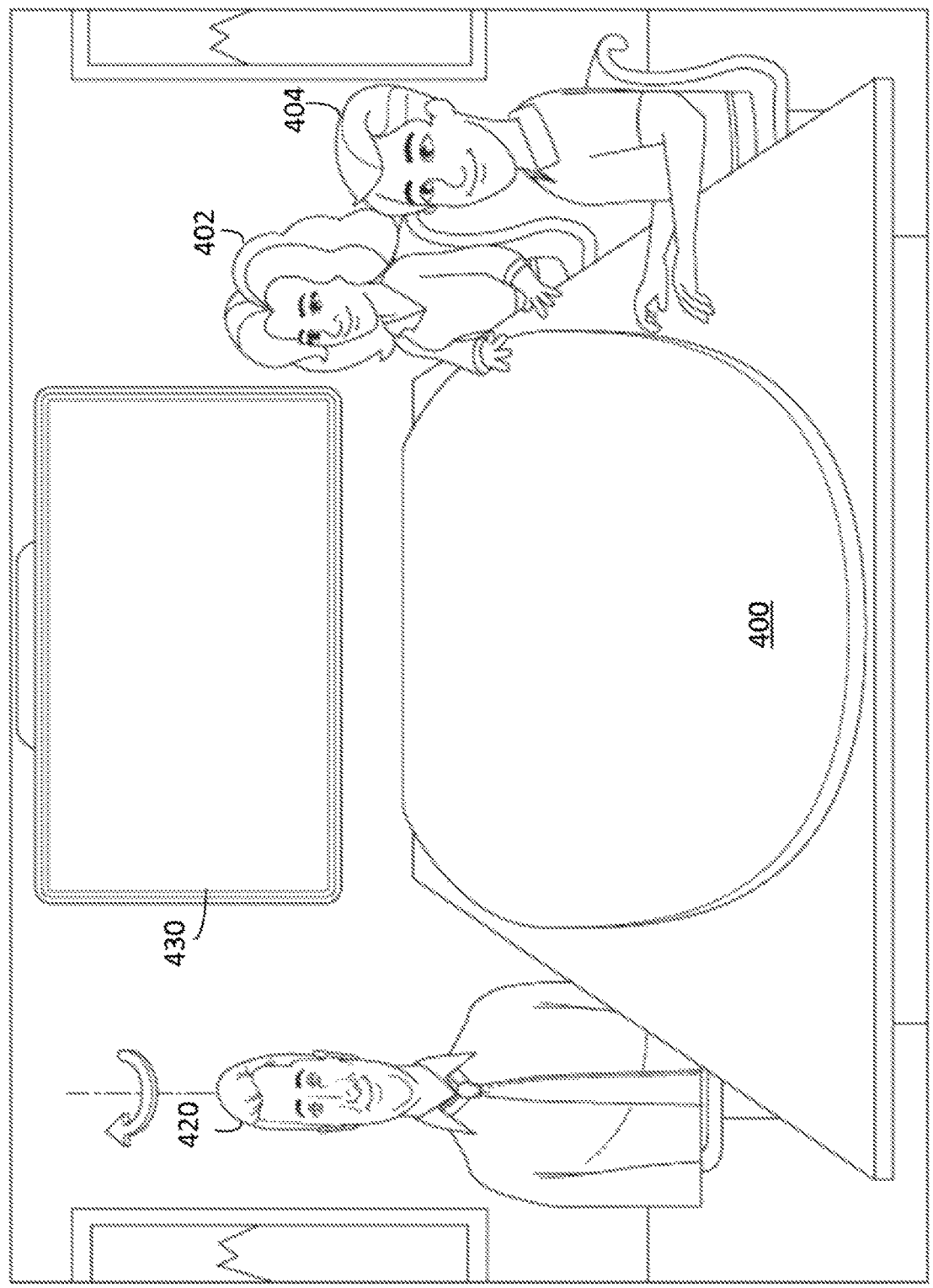
FIG. 10 illustrates an exemplary virtual environment according to one embodiment of the present disclosure.

FIG. 10 illustrates an exemplary virtual environment 400 according to one embodiment of the present disclosure. As described elsewhere herein, the virtual environment 400 may comprise a VR or AR environment such as a 3D world including digital representations, such as 3D avatars 402, 404, of one or more users and a digital representation 420 of a video conference participant.

In an embodiment, head or body movement of the video conference participant may be displayed on the digital representation 420 of the video conference participant. In an embodiment, the displayed head or body movement is based on user movement information from user tracker 176. User movement information may comprise head movement information and/or body movement information. In one embodiment, user tracker 176 may detect turning of the head of the video conference participant, and the head of the digital representation 420 may be turned in the virtual environment corresponding to the turn of the head of the participant. In one embodiment, user tracker 176 may detect rotation of the head up or down (such as nodding, lifting the chin, and so on) of the video conference participant, and head of the digital representation 420 may be rotated up or down in the virtual environment corresponding to the rotation of the head of the participant. In one embodiment, user tracker 176 may detect turning of the head of the video conference participant, and the body of the digital representation 420 may be turned in the virtual environment corresponding to the turn of the head of the participant. In one embodiment, user tracker 176 may detect turning of the body of the video conference participant, and the body of the digital representation 420 may be turned in the virtual environment corresponding to the turn of the body of the participant.

In an embodiment, user tracker 176 may determine the direction of the turn or rotation of the head or body of the video conference participant, and the same direction of turn or rotation may be applied to the head or body of the digital representation 420. In an embodiment, user tracker 176 may determine the angle of the turn or rotation of the head or body of the video conference participant, and the same angle of turn or rotation may be applied to the head or body of the digital representation 420. In an embodiment, user tracker 176 may determine the angle of the turn or rotation of the head or body of the video conference participant, and a greater angle of turn or rotation may be applied to the head or body of the digital representation 420. For example, the head or body of the video conference participant may turn by a small amount, and the head or body of the digital representation 420 may turn by a large amount. In an embodiment, user tracker 176 may determine the angle of the turn or rotation of the head or body of the video conference participant, and a lesser angle of turn or rotation may be applied to the head or body of the digital representation 420. For example, the head or body of the video conference participant may turn by a large amount, and the head or body of the digital representation 420 may turn by a small amount.

In an embodiment, one or more indicators may be displayed to indicate head or body movement of the video conference participant, such as one or more arrows, text, color changes, highlights, or other indicators. In an embodiment, the one or more indicators may be displayed based on user movement information from user tracker 176. In one embodiment, an arrow indicator may be displayed indicating a direction of turn when a turn of the head of the video conference participant is detected.

In an embodiment, movement of one or more other body parts of the video conference participant may be displayed on the digital representation 420 of the video conference participant based on user movement information from user tracker 176. For example, body parts may include arms, hands, legs, and so on. For example, in one embodiment, the user tracker 176 may detect movement of an arm, hand, or leg of the video conference participant and display the same movement on an arm, hand, or leg of the digital representation 420. For example, in one embodiment, when the user tracker 176 detects that the arm of the video conference participant has moved forward or backward, the arm of the digital representation 420 may be moved forward or backward in a corresponding motion.

Figure 11:
FIG. 11 illustrates an exemplary digital representation of a video conference participant according to one embodiment of the present disclosure.

FIG. 11 illustrates an exemplary digital representation 1110 of a video conference participant according to one embodiment of the present disclosure. In an embodiment, digital representation 420 of the video conference participant may comprise 3D avatar 1110. 3D avatar 1110 of the video conference participant may be displayed in the virtual environment 400 to represent the video conference participant 326.

In an embodiment, head or body movement of the video conference participant may be displayed on the 3D avatar 1110 as described elsewhere herein. In an embodiment, the head 1112 of the 3D avatar 1110 may move based on head movement information from user tracker 176 to match the movement of the head of the video conference participant. In an embodiment, the body 1114 of the 3D avatar 1110 may move based on body movement information from user tracker 176 to match the movement of the body of the video conference participant.

Figure 12:
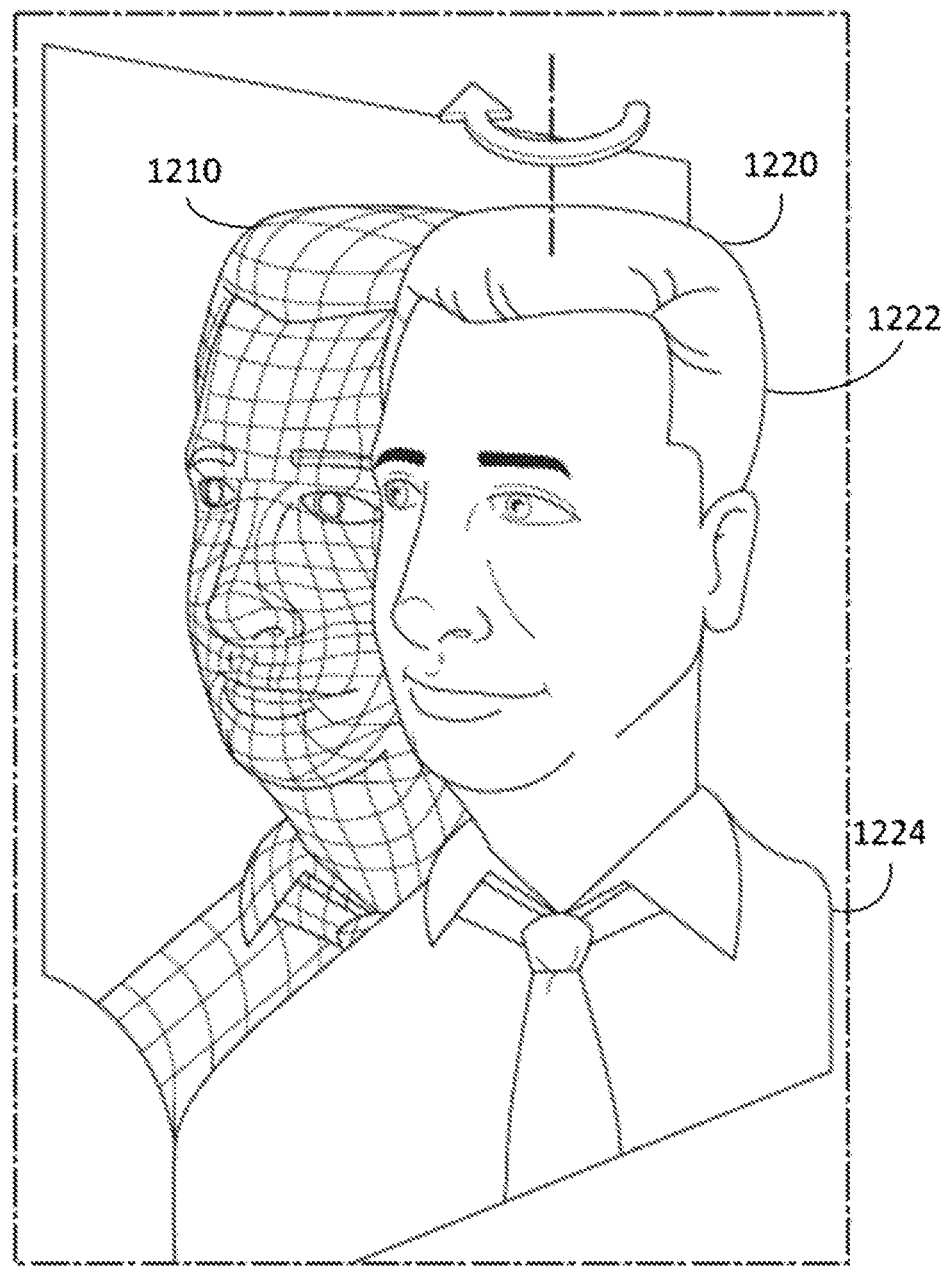
FIG. 12 illustrates an exemplary digital representation of a video conference participant according to one embodiment of the present disclosure.

FIG. 12 illustrates an exemplary digital representation 1220 of a video conference participant according to one embodiment of the present disclosure. In an embodiment, digital representation 420 of the video conference participant may comprise textured 3D mesh 1220. Textured 3D mesh 1220 may be displayed in the virtual environment 400 to represent the video conference participant 326. In one embodiment, a 3D mesh 1210 may be generated based on the video of the video conference participant by using artificial intelligence, machine learning, or other methods. In one embodiment, video of the video conference participant is displayed on a 3D mesh 1210 of the video conference participant to generate textured 3D mesh 1220. In an embodiment, the textured 3D mesh 1220 is textured with streaming video of the video conference participant.

In an embodiment, head or body movement of the video conference participant may be displayed on the textured 3D mesh 1220 as described elsewhere herein. In an embodiment, the head 1222 of the textured 3D mesh 1220 may move based on head movement information from user tracker 176 to match the movement of the head of the video conference participant. In an embodiment, the body 1224 of the textured 3D mesh 1220 may move based on body movement information from user tracker 176 to match the movement of the body of the video conference participant.

III. Exemplary Methods

Figure 13:
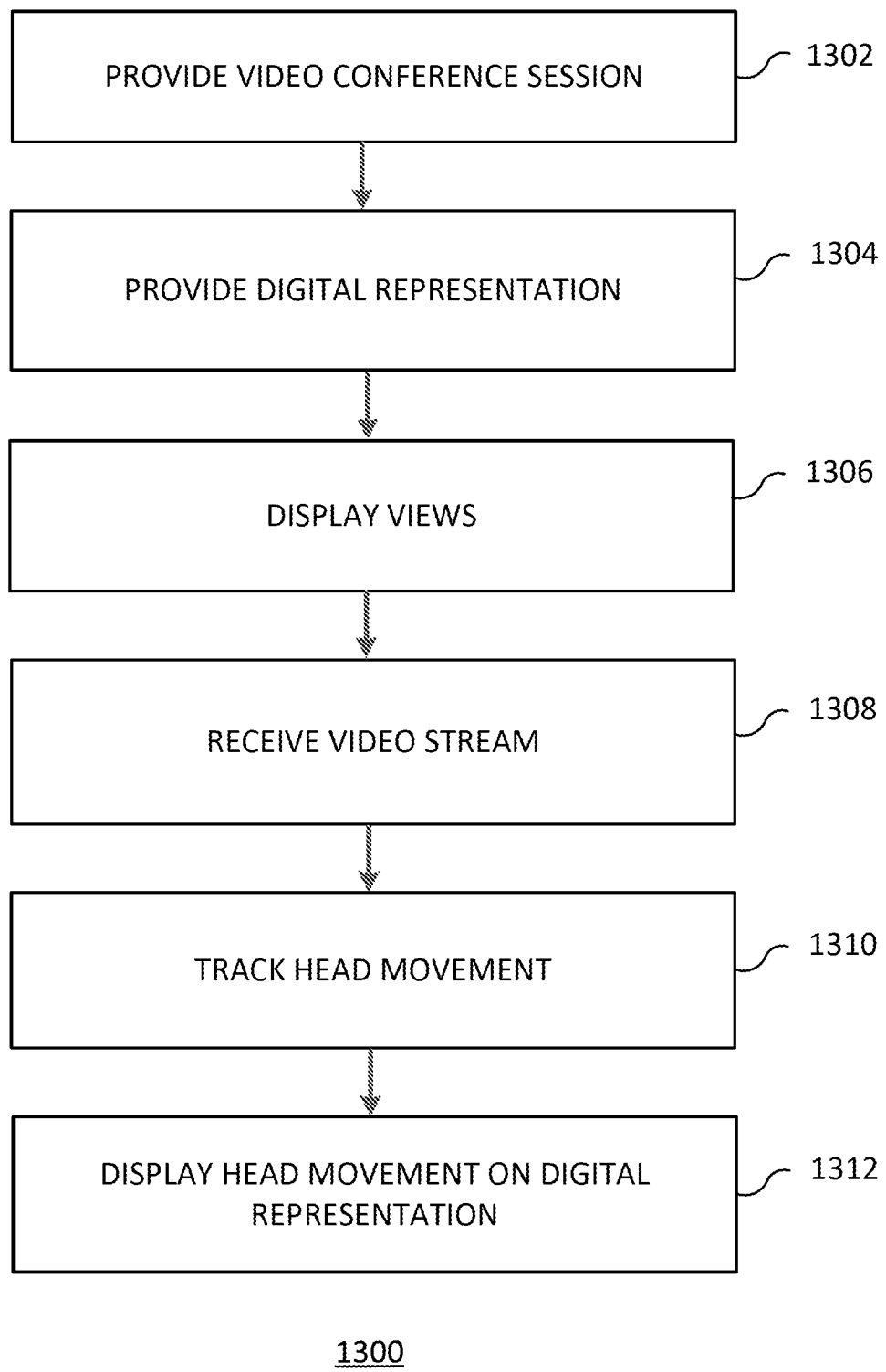
FIG. 13 illustrates an exemplary method that may be performed in some embodiments.

FIG. 13 illustrates an exemplary method 1300 that may be performed in some embodiments.

At step 1302, a video conference session may be provided in a virtual environment. In an embodiment, the video conference session is hosted on a server and may connect a plurality of video conference participants. In an embodiment, the video conference session may connect one or more VR/AR users in the virtual environment and one or more video conference participants joining from one or more computer systems.

At step 1304, a digital representation of a video conference participant is provided in the virtual environment and a left view of the virtual environment is captured to the left of the digital representation and a right view of the virtual environment is captured to the right of the digital representation. In an embodiment, the digital representation may comprise a 2D or 3D representation of the video conference participant. In one embodiment, the digital representation may comprise streaming video of the video conference participant. In an embodiment, a left virtual camera captures the left view of the virtual environment, and a right virtual camera captures the right view of the virtual environment. In an embodiment, a wide-angle virtual camera captures the left view of the virtual environment and the right view of the virtual environment. In an embodiment, one or more virtual cameras capture additional views of the virtual environment, such as a front view of the virtual environment.

At step 1306, the left view is displayed to the left of the video conference participant and the right view is displayed to the right of the video conference participant. In an embodiment, the left view is displayed on a left screen, and the right view is displayed on a right screen. In an embodiment, a front view may be displayed on a center screen.

At step 1308, a video stream is received of the video conference participant. In an embodiment, the video stream may be received from a video conference application.

At step 1310, head movement of the video conference participant is tracked in the video stream to generate head movement information. In an embodiment, the head movement of the video conference participant may be tracked using artificial intelligence or machine learning.

At step 1312, the head movement of the video conference participant is displayed on the digital representation of the video conference participant based on the head movement information. In one embodiment, the head of the digital representation of the video conference participant is turned based on the head movement information. In one embodiment, the body of the digital representation of the video conference participant is turned based on the head movement information.

Figure 14:
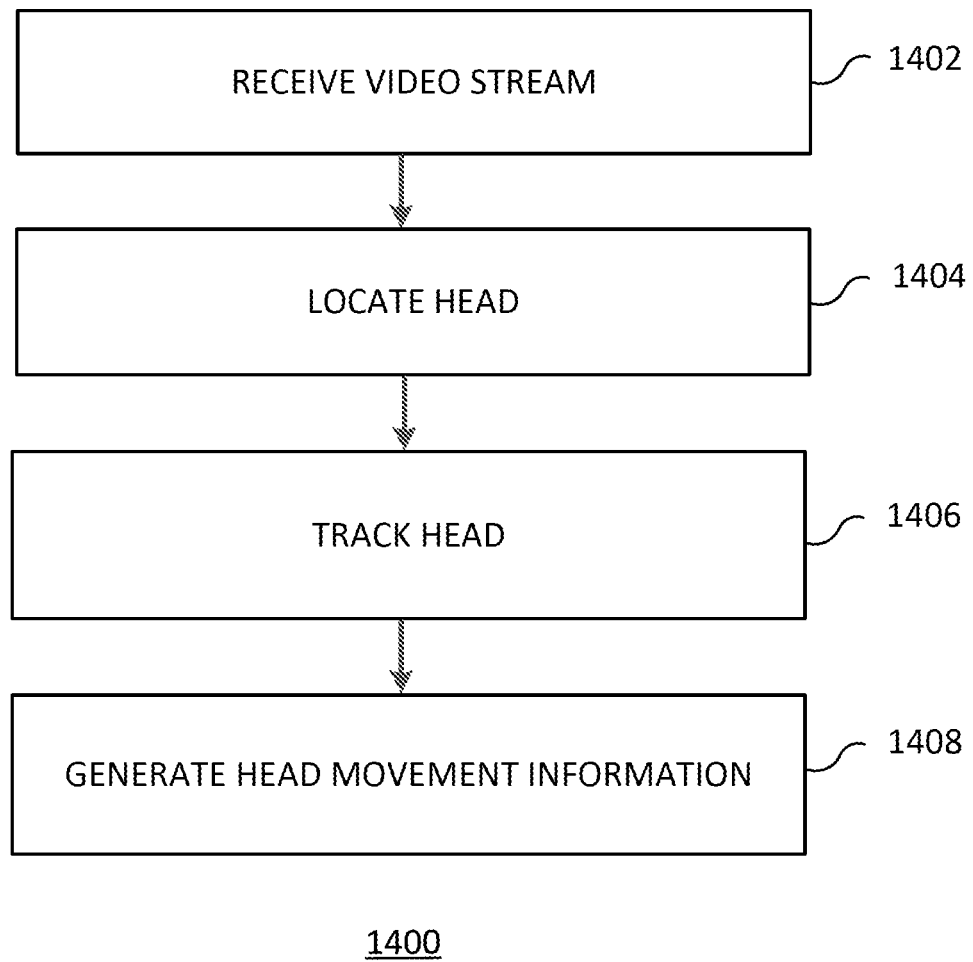
FIG. 14 illustrates an exemplary method that may be performed in some embodiments.

FIG. 14 illustrates an exemplary method 1400 that may be performed in some embodiments.

At step 1402, a video stream is received of a video conference participant. In an embodiment, the video stream may be received from a video conference application.

At step 1404, the head of the video conference participant is located in the video stream. In an embodiment, the head of the video conference participant is located in the video stream using artificial intelligence or machine learning. In an embodiment, the head of the video conference participant is located in the video stream using eye tracking, face detection, face tracking, person detection, body pose detection and estimation, edge detection, image segmentation, image matting, or other computer vision and image processing methods.

At step 1406, the head of the video conference participant is tracked to detect movement. In an embodiment, the head of the video conference participant is tracked to detect movement using artificial intelligence or machine learning. In an embodiment, the head of the video conference participant is tracked to detect movement using eye tracking, face detection, face tracking, person detection, body pose detection and estimation, edge detection, image segmentation, image matting, or other computer vision and image processing methods.

At step 1408, the detected movement is used to generate head movement information. In an embodiment, head movement of the video conference participant is displayed on a digital representation of the video conference participant based on the head movement information.

Exemplary Computer System

Figure 15:
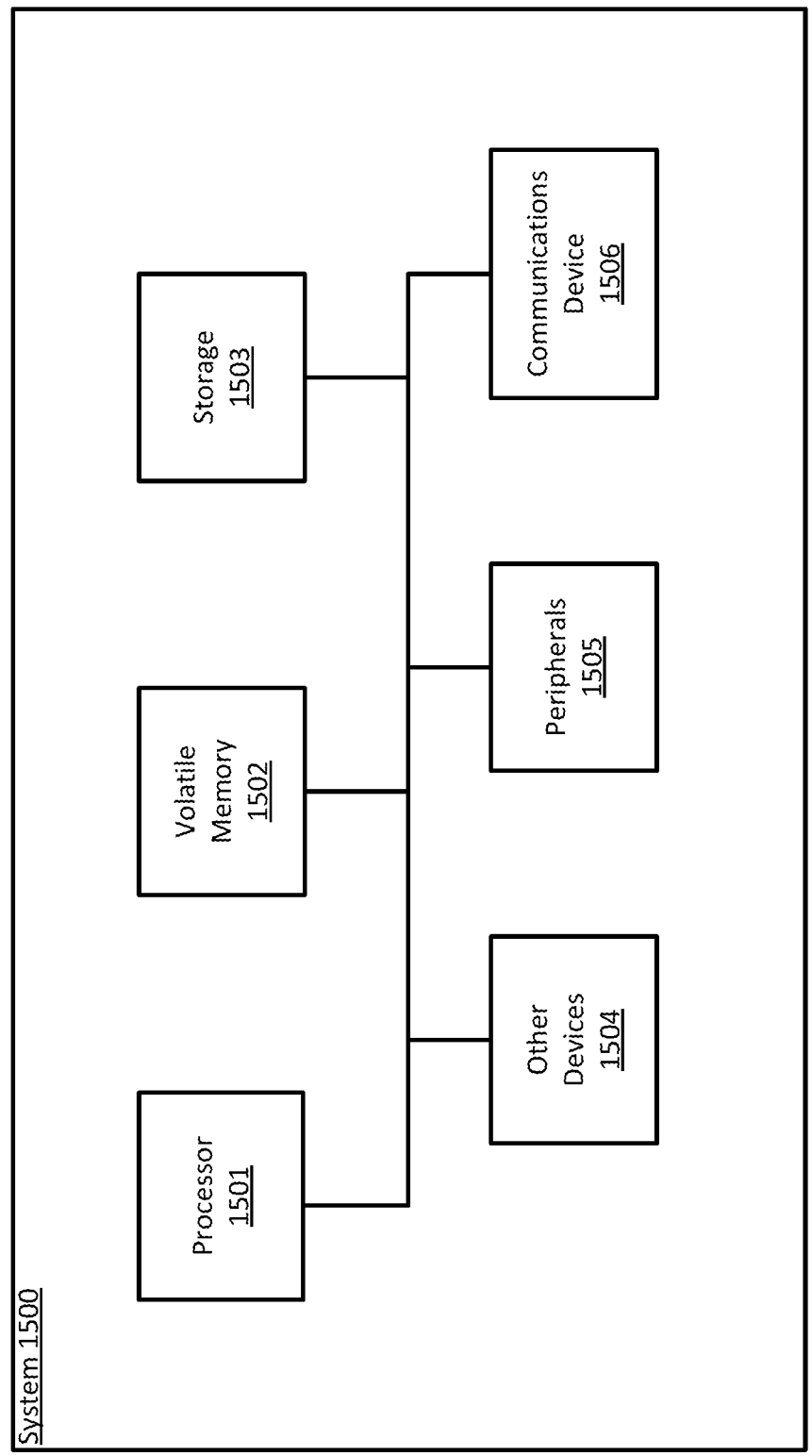
FIG. 15 is a diagram illustrating an exemplary computer that may perform processing in some embodiments.

FIG. 15 is a diagram illustrating an exemplary computer that may perform processing in some embodiments. Exemplary computer 1500 may perform operations consistent with some embodiments. The architecture of computer 1500 is exemplary. Computers can be implemented in a variety of other ways. A wide variety of computers can be used in accordance with the embodiments herein.

Processor 1501 may perform computing functions such as running computer programs. The volatile memory 1502 may provide temporary storage of data for the processor 1501. RAM is one kind of volatile memory. Volatile memory typically requires power to maintain its stored information. Storage 1503 provides computer storage for data, instructions, and/or arbitrary information. Non-volatile memory, which can preserve data even when not powered and including disks and flash memory, is an example of storage. Storage 1503 may be organized as a file system, database, or in other ways. Data, instructions, and information may be loaded from storage 1503 into volatile memory 1502 for processing by the processor 1501.

The computer 1500 may include peripherals 1505. Peripherals 1505 may include input peripherals such as a keyboard, mouse, trackball, video camera, microphone, and other input devices. Peripherals 1505 may also include output devices such as a display. Peripherals 1505 may include removable media devices such as CD-R and DVD-R recorders/players. Communications device 1506 may connect the computer 1500 to an external medium. For example, communications device 1506 may take the form of a network adapter that provides communications to a network. A computer 1500 may also include a variety of other devices 1504. The various components of the computer 1500 may be connected by a connection medium such as a bus, crossbar, or network.

It will be appreciated that the present disclosure may include any one and up to all of the following examples.

Example 1: A method comprising: providing a video conference session in a virtual environment; providing a digital representation of a video conference participant in the virtual environment and capturing a left view of the virtual environment to the left of the digital representation and a right view of the virtual environment to the right of the digital representation; displaying the left view to the left of the video conference participant and displaying the right view to the right of the video conference participant; receiving a video stream of the video conference participant; tracking, in the video stream, head movement of the video conference participant to generate head movement information; displaying the head movement of the video conference participant on the digital representation of the video conference participant based on the head movement information.

Example 2: The method of Example 1, wherein the virtual environment comprises a VR environment including 3D avatars of one or more users.

Example 3: The method of any of Examples 1-2, wherein the virtual environment comprises an AR environment comprising one or more AR holograms.

Example 4: The method of any of Examples 1-3, further comprising: providing the left view of the virtual environment and the right view of the virtual environment in a second video stream in the video conference session.

Example 5: The method of any of Examples 1-4, further comprising: turning a head of the digital representation of the video conference participant by an amount corresponding to an amount of a turn of the head of the video conference participant.

Example 6: The method of any of Examples 1-5, further comprising: turning a body of the digital representation of the video conference participant based on the head movement information.

Example 7: The method of any of Examples 1-6, wherein the digital representation of the video conference participant comprises a flat shape in the virtual environment displaying at least a portion of the video stream of the video conference participant.

Example 8: The method of any of Examples 1-7, further comprising: turning a head of the digital representation of the video conference participant by an amount equal to an amount of turn of the head of the video conference participant.

Example 9: The method of any of Examples 1-8, further comprising: turning a body of the digital representation of the video conference participant by an amount equal to an amount of turn of the head of the video conference participant.

Example 10: The method of any of Examples 1-9, further comprising: capturing a front view of the virtual environment in front of the digital representation; displaying the front view in front of the video conference participant.

Example 11: The method of any of Examples 1-10, wherein the left view is captured by a left virtual camera and the right view is captured by a right virtual camera.

Example 12: The method of any of Examples 1-11, wherein the left view and the right view are captured by a wide-angle virtual camera.

Example 13: The method of any of Examples 1-12, further comprising: generating a 3D mesh based on at least a portion of the video stream of the video conference participant; providing the at least a portion of the video stream on the 3D mesh.

Example 14: The method of any of Examples 1-13, wherein the digital representation of the video conference participant comprises a 3D avatar.

Example 15: The method of any of Examples 1-14, wherein the video conference session and virtual environment communicate via an SDK.

Example 16: The method of any of Examples 1-15, wherein the digital representation of the video conference participant is provided through an API.

Example 17: A non-transitory computer readable medium that stores executable program instructions that when executed by one or more computing devices configure the one or more computing devices to perform operations comprising: providing a video conference session in a virtual environment; providing a digital representation of a video conference participant in the virtual environment and capturing a left view of the virtual environment to the left of the digital representation and a right view of the virtual environment to the right of the digital representation; displaying the left view to the left of the video conference participant and displaying the right view to the right of the video conference participant; receiving a video stream of the video conference participant; tracking, in the video stream, head movement of the video conference participant to generate head movement information; displaying the head movement of the video conference participant on the digital representation of the video conference participant based on the head movement information.

Example 18: The non-transitory computer readable medium of Example 17, wherein the virtual environment comprises a VR environment including 3D avatars of one or more users.

Example 19: The non-transitory computer readable medium of any of Examples 17-18, wherein the virtual environment comprises an AR environment comprising one or more AR holograms.

Example 20: The non-transitory computer readable medium of any of Examples 17-19, wherein the executable program instructions further configure the one or more computing devices to perform operations comprising: providing the left view of the virtual environment and the right view of the virtual environment in a second video stream in the video conference session.

Example 21: The non-transitory computer readable medium of any of Examples 17-20, wherein the executable program instructions further configure the one or more computing devices to perform operations comprising: turning a head of the digital representation of the video conference participant based on the head movement information.

Example 22: The non-transitory computer readable medium of any of Examples 17-21, wherein the executable program instructions further configure the one or more computing devices to perform operations comprising: turning a body of the digital representation of the video conference participant based on the head movement information.

Example 23: The non-transitory computer readable medium of any of Examples 17-22, wherein the digital representation of the video conference participant comprises a flat shape in the virtual environment displaying at least a portion of the video stream of the video conference participant.

Example 24: The non-transitory computer readable medium of any of Examples 17-23, wherein the executable program instructions further configure the one or more computing devices to perform operations comprising: turning a head of the digital representation of the video conference participant by an amount corresponding to an amount of a turn of the head of the video conference participant.

Example 25: The non-transitory computer readable medium of any of Examples 17-24, wherein the executable program instructions further configure the one or more computing devices to perform operations comprising: turning a body of the digital representation of the video conference participant by an amount equal to an amount of turn of the head of the video conference participant.

Example 26: The non-transitory computer readable medium of any of Examples 17-25, wherein the executable program instructions further configure the one or more computing devices to perform operations comprising: capturing a front view of the virtual environment in front of the digital representation; displaying the front view in front of the video conference participant.

Example 27: The non-transitory computer readable medium of any of Examples 17-26, wherein the left view is captured by a left virtual camera and the right view is captured by a right virtual camera.

Example 28: The non-transitory computer readable medium of any of Examples 17-27, wherein the left view and the right view are captured by a wide-angle virtual camera.

Example 29: The non-transitory computer readable medium of any of Examples 17-28, wherein the executable program instructions further configure the one or more computing devices to perform operations comprising: generating a 3D mesh based on at least a portion of the video stream of the video conference participant; providing the at least a portion of the video stream on the 3D mesh.

Example 30: The non-transitory computer readable medium of any of Examples 17-29, wherein the digital representation of the video conference participant comprises a 3D avatar.

Example 31: The non-transitory computer readable medium of any of Examples 17-30, wherein the video conference session and virtual environment communicate via an SDK.

Example 32: The non-transitory computer readable medium of any of Examples 17-31, wherein the digital representation of the video conference participant is provided through an API.

Example 33: A system comprising one or more processors configured to perform the operations of: providing a video conference session in a virtual environment; providing a digital representation of a video conference participant in the virtual environment and capturing a left view of the virtual environment to the left of the digital representation and a right view of the virtual environment to the right of the digital representation; displaying the left view to the left of the video conference participant and displaying the right view to the right of the video conference participant; receiving a video stream of the video conference participant; tracking, in the video stream, head movement of the video conference participant to generate head movement information; displaying the head movement of the video conference participant on the digital representation of the video conference participant based on the head movement information.

Example 34: The system of Example 33, wherein the virtual environment comprises a VR environment including 3D avatars of one or more users.

Example 35: The system of any of Examples 33-34, wherein the virtual environment comprises an AR environment comprising one or more AR holograms.

Example 36: The system of any of Examples 33-35, wherein the processors are further configured to perform the operations of: providing the left view of the virtual environment and the right view of the virtual environment in a second video stream in the video conference session.

Example 37: The system of any of Examples 33-36, wherein the processors are further configured to perform the operations of: turning a head of the digital representation of the video conference participant based on the head movement information.

Example 38: The system of any of Examples 33-37, wherein the processors are further configured to perform the operations of: turning a body of the digital representation of the video conference participant based on the head movement information.

Example 39: The system of any of Examples 33-38, wherein the digital representation of the video conference participant comprises a flat shape in the virtual environment displaying at least a portion of the video stream of the video conference participant.

Example 40: The system of any of Examples 33-39, wherein the processors are further configured to perform the operations of: turning a head of the digital representation of the video conference participant by an amount corresponding to an amount of a turn of the head of the video conference participant.

Example 41: The system of any of Examples 33-40, wherein the processors are further configured to perform the operations of: turning a body of the digital representation of the video conference participant by an amount equal to an amount of turn of the head of the video conference participant.

Example 42: The system of any of Examples 33-41, wherein the processors are further configured to perform the operations of: capturing a front view of the virtual environment in front of the digital representation; displaying the front view in front of the video conference participant.

Example 43: The system of any of Examples 33-42, wherein the left view is captured by a left virtual camera and the right view is captured by a right virtual camera.

Example 44: The system of any of Examples 33-43, wherein the left view and the right view are captured by a wide-angle virtual camera.

Example 45: The system of any of Examples 33-44, wherein the processors are further configured to perform the operations of: generating a 3D mesh based on at least a portion of the video stream of the video conference participant; providing the at least a portion of the video stream on the 3D mesh.

Example 46: The system of any of Examples 33-45, wherein the digital representation of the video conference participant comprises a 3D avatar.

Example 47: The system of any of Examples 33-46, wherein the video conference session and virtual environment communicate via an SDK.

Example 48: The system of any of Examples 33-47, wherein the digital representation of the video conference participant is provided through an API.

Example 49: A method comprising: providing a video conference session in a virtual environment; providing a digital representation of a video conference participant in the virtual environment and capturing a left view of the virtual environment to the left of the digital representation and a right view of the virtual environment to the right of the digital representation; displaying the left view to the left of the video conference participant and displaying the right view to the right of the video conference participant; receiving a video stream of the video conference participant; tracking, in the video stream, body movement of the video conference participant to generate body movement information; displaying the body movement of the video conference participant on the digital representation of the video conference participant based on the body movement information.

Example 50: The method of Example 49, further comprising: turning a body of the digital representation of the video conference participant based on the body movement information.

Example 51: The method of any of Examples 49-50, wherein the digital representation of the video conference participant comprises a flat shape in the virtual environment displaying at least a portion of the video stream of the video conference participant.

Example 52: The method of any of Examples 49-51, further comprising: turning a body of the digital representation of the video conference participant by an amount equal to an amount of turn of the body of the video conference participant.

Example 53: A non-transitory computer readable medium that stores executable program instructions that when executed by one or more computing devices configure the one or more computing devices to perform operations comprising: providing a video conference session in a virtual environment; providing a digital representation of a video conference participant in the virtual environment and capturing a left view of the virtual environment to the left of the digital representation and a right view of the virtual environment to the right of the digital representation; displaying the left view to the left of the video conference participant and displaying the right view to the right of the video conference participant; receiving a video stream of the video conference participant; tracking, in the video stream, body movement of the video conference participant to generate body movement information; displaying the body movement of the video conference participant on the digital representation of the video conference participant based on the body movement information.

Example 54: The non-transitory computer readable medium of Example 53, wherein the executable program instructions further configure the one or more computing devices to perform operations comprising: turning a body of the digital representation of the video conference participant based on the body movement information.

Example 55: The non-transitory computer readable medium of any of Examples 53-54, wherein the digital representation of the video conference participant comprises a flat shape in the virtual environment displaying at least a portion of the video stream of the video conference participant.

Example 56: The non-transitory computer readable medium of any of Examples 53-55, wherein the executable program instructions further configure the one or more computing devices to perform operations comprising: turning a body of the digital representation of the video conference participant by an amount equal to an amount of turn of the body of the video conference participant.

Example 57: A system comprising one or more processors configured to perform the operations of: providing a video conference session in a virtual environment; providing a digital representation of a video conference participant in the virtual environment and capturing a left view of the virtual environment to the left of the digital representation and a right view of the virtual environment to the right of the digital representation; displaying the left view to the left of the video conference participant and displaying the right view to the right of the video conference participant; receiving a video stream of the video conference participant; tracking, in the video stream, body movement of the video conference participant to generate body movement information; displaying the body movement of the video conference participant on the digital representation of the video conference participant based on the body movement information.

Example 58: The system of Example 57, wherein the processors are further configured to perform the operations of: turning a body of the digital representation of the video conference participant based on the body movement information.

Example 59: The system of any of Examples 57-58, wherein the digital representation of the video conference participant comprises a flat shape in the virtual environment displaying at least a portion of the video stream of the video conference participant.

Example 60: The system of any of Examples 57-59, wherein the processors are further configured to perform the operations of: turning a body of the digital representation of the video conference participant by an amount equal to an amount of turn of the body of the video conference participant.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
   receiving a video stream of a video conference participant in a virtual environment;
   detecting, within the video stream, movement of the video conference participant performing an act of viewing past a boundary;
   generating movement information indicating the act of viewing past the boundary; and
   triggering an action for updating a digital representation of the video conference participant based on the movement information.

2. The method of claim 1, wherein the virtual environment comprises one of: (i) a virtual reality (VR) environment including 3D representations of one or more users and (ii) an augmented reality (AR) environment comprising one or more AR holograms.

3. The method of claim 1, further comprising: providing a captured left view of the virtual environment and a captured right view of the virtual environment as part of the video stream or in a second video stream in a video conference session.

4. The method of claim 1, further comprising:
   turning a head of the digital representation of the video conference participant by an amount corresponding to an amount of a turn of the head of the video conference participant.

5. The method of claim 1, further comprising:
   turning a body of the digital representation of the video conference participant based on the movement information.

6. The method of claim 1, wherein the digital representation of the video conference participant comprises a flat shape in the virtual environment displaying at least a portion of the video stream of the video conference participant.

7. The method of claim 1, wherein detecting movement that corresponds with the video conference participant performing an act of viewing past a boundary comprises:
   identifying a direction of movement of the act; and
   wherein generating movement information that indicates the act of viewing past the boundary comprises:
      associating a direction attribute with the movement information based on the identified direction of movement of the act.

8. The method of claim 1, wherein triggering an action for updating the digital representation comprises:
   updating a current viewpoint of the digital representation based at least on a direction of the movement information, wherein the boundary comprises: a current physical placement of an edge relative to a screen displaying at least a portion of a respective view of the virtual environment.

9. The method of claim 1, wherein a left view of the virtual environment left of the digital representation is a different view than a right view of the virtual environment right of the digital representation.

10. An apparatus, comprising:
    a memory; and
    a processor configured to execute instructions stored in the memory to:
       receive a video stream of a video conference participant in a virtual environment;
       detect, within the video stream, movement of the video conference participant performing an act of viewing past a boundary;
       generate movement information indicating the act of viewing past the boundary; and
       trigger an action for updating a digital representation of the video conference participant based on the movement information.

11. The apparatus of claim 10, wherein the processor is further configured to execute instructions stored in the memory to:
    provide a captured left view of the virtual environment and a captured right view of the virtual environment as part of the video stream or in a second video stream in a video conference session.

12. The apparatus of claim 10, wherein the processor is further configured to execute instructions stored in the memory to:

turn a head of the digital representation of the video conference participant by an amount corresponding to an amount of a turn of the head of the video conference participant.

13. The apparatus of claim 10, wherein the processor is further configured to execute instructions stored in the memory to:
turn a body of the digital representation of the video conference participant based on the movement information.

14. The apparatus of claim 10, wherein the digital representation of the video conference participant comprises a flat shape in the virtual environment displaying at least a portion of the video stream of the video conference participant.

15. A non-transitory computer readable medium storing instructions operable to cause one or more processors to perform operations comprising:
receiving a video stream of a video conference participant in a virtual environment;
detecting, within the video stream, movement of the video conference participant performing an act of viewing past a boundary;
generating movement information indicating of the act of viewing past the boundary; and
triggering an action for updating a digital representation of the video conference participant based on the movement information.

16. The non-transitory computer readable medium of claim 15, wherein the virtual environment comprises a VR environment including 3D representations of one or more users.

17. The non-transitory computer readable medium of claim 15, wherein the processors are further configured to perform the operations of:
turning a head of the digital representation of the video conference participant by an amount corresponding to a turn of the head of the video conference participant.

18. The non-transitory computer readable medium of claim 15, wherein the processors are further configured to perform the operations of:
turning a body of the digital representation of the video conference participant based on detected movement information.

19. The non-transitory computer readable medium of claim 15, wherein the digital representation of the video conference participant comprises a flat shape in the virtual environment displaying at least a portion of the video stream of the video conference participant.

20. The non-transitory computer readable medium of claim 15, wherein detecting movement that corresponds with the video conference participant performing an act of viewing past a boundary comprises:
identifying a direction of movement of the act; and
wherein generating movement information indicating the act of viewing past the boundary comprises:
associating a direction attribute with the movement information based on the identified direction of movement of the act.

* * * * *